United States Patent
Syn et al.

(10) Patent No.: US 10,101,624 B2
(45) Date of Patent: Oct. 16, 2018

(54) DISPLAY DEVICE

(71) Applicant: SAMSUNG DISPLAY CO., LTD., Yongin-si, Gyeonggi-Do (KR)

(72) Inventors: Seongyeol Syn, Asan-si (KR); Jihee Yoon, Asan-si (KR); Yonghee Lee, Suwon-si (KR); Beomjun Kim, Seoul (KR); Jonghwan Lee, Asan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/805,957

(22) Filed: Nov. 7, 2017

(65) Prior Publication Data

US 2018/0129110 A1 May 10, 2018

(30) Foreign Application Priority Data

Nov. 8, 2016 (KR) .................. 10-2016-0148116

(51) Int. Cl.
*G02F 1/1362* (2006.01)
*G02F 1/1343* (2006.01)
*G02F 1/136* (2006.01)

(52) U.S. Cl.
CPC .... *G02F 1/136286* (2013.01); *G02F 1/13439* (2013.01); *G02F 1/13624* (2013.01); *G02F 1/134309* (2013.01); *G02F 1/136209* (2013.01); *G02F 1/136213* (2013.01); *G02F 1/136227* (2013.01); *G02F 2001/13606* (2013.01); *G02F 2001/13629* (2013.01); *G02F 2001/134345* (2013.01); *G02F 2001/136222* (2013.01); *G02F 2001/136295* (2013.01); *G02F 2201/123* (2013.01)

(58) Field of Classification Search
CPC ... G02F 2001/13606; G02F 2001/1357; G02F 1/134309
See application file for complete search history.

(56) References Cited

FOREIGN PATENT DOCUMENTS

| KR | 1020090058099 | 6/2009 |
| KR | 1020110111227 | 10/2011 |
| KR | 1020120105722 | 9/2012 |
| KR | 1020150008837 | 1/2015 |

*Primary Examiner* — Sonya D McCall Shepard
(74) *Attorney, Agent, or Firm* — F. Chau & Associates, LLC.

(57) ABSTRACT

A display device includes a gate line; first and second adjacent data lines intersecting the gate line; a first sub-pixel electrode between the first and second data lines; a second sub-pixel electrode between the first gate line and the first sub-pixel electrode; a first switching element connected to the first gate line, the first data line and the first sub-pixel electrode; a second switching element connected to the first gate line, the first data line and the second sub-pixel electrode; a connection electrode connecting the first sub-pixel electrode and the first switching element; a first dummy electrode between the first data line and the second sub-pixel electrode; and a second dummy electrode extending from the connection electrode and is disposed closer to the first data line than the second data line. End portions of the first and second dummy electrodes face each other.

20 Claims, 18 Drawing Sheets

FIG. 18

|  |  | −3μm | 0 | +3μm |
|---|---|---|---|---|
| EVEN | High_Cdp_L | 0.326 | 0.296 | 0.262 |
|  | High_Cdp_R | 0.322 | 0.266 | 0.447 |
|  | Low_Cdp_L | 1.963 | 1.386 | 1.545 |
|  | Low_Cdp_R | 0.740 | 1.385 | 3.510 |
| ODD | High_Cdp_L | 0.447 | 0.367 | 0.322 |
|  | High_Cdp_R | 0.262 | 0.296 | 0.326 |
|  | Low_Cdp_L | 3.522 | 1.391 | 0.746 |
|  | Low_Cdp_R | 1.519 | 1.366 | 1.948 |
| ΔLow_Cdp(L−R) | EVEN | 1.223 | 0.002 | 1.965 |
|  | ODD | 2.003 | 0.025 | 1.202 |
|  | AVG | 1.613 | 0.013 | 1.584 |

DISPLAY DEVICE

CROSS-REFERENCE TO RELATED APPLICATION

This application claims priority under 35 U.S.C. § 119 from, and the benefit of, Korean Patent Application No. 10-2016-0148116, filed on Nov. 8, 2016 in the Korean Intellectual Property Office, the contents of which are herein incorporated by reference in their entirety.

BACKGROUND

1. Technical Field

Exemplary embodiments of the disclosure are directed to a display device that can display an image of improved image quality.

2. Discussion of the Related Art

Liquid crystal display ("LCD") devices are one of most widely used types of flat panel display ("FPD") devices. An LCD device includes two substrates with electrodes formed thereon and a liquid crystal layer interposed therebetween. Upon applying voltages to the electrodes, liquid crystal molecules of the liquid crystal layer are rearranged such that an amount of transmitted light is controlled in the LCD device.

SUMMARY

Exemplary embodiments of the disclosure are directed to a display device that can display an image of improved image quality.

According to an exemplary embodiment of the disclosure, a display device includes: a first gate line; a first data line and a second data line that are disposed adjacent to each other and that intersect the first gate line; a first sub-pixel electrode disposed between the first data line and the second data line; a second sub-pixel electrode disposed between the first gate line and the first sub-pixel electrode; a first switching element connected to the first gate line, the first data line and the first sub-pixel electrode; a second switching element connected to the first gate line, the first data line and the second sub-pixel electrode; a connection electrode that connects the first sub-pixel electrode and the first switching element; a first dummy electrode disposed between the first data line and the second sub-pixel electrode; and a second dummy electrode that extends from the connection electrode and is disposed closer to the first data line than the second data line. An end portion of the first dummy electrode and an end portion of the second dummy electrode face each other.

A distance between facing sides of the first dummy electrode and the first data line may be substantially equal to a distance between facing sides of the second dummy electrode and the first data line.

The display device may further include: an extension electrode that extends from the first data line and is connected to the first switching element and the second switching element, wherein at least a portion of the extension electrode is disposed between the first dummy electrode and the second dummy electrode.

A distance between facing sides of the first dummy electrode and the extension electrode may be different from a distance between facing sides of the second dummy electrode and the extension electrode.

The distance between the facing sides of the first dummy electrode and the extension electrode may be greater than the distance between the facing sides of the second dummy electrode and the extension electrode.

The connection electrode may not overlap the first data line or the extension electrode.

The first dummy electrode may be longer than the second dummy electrode.

A distance between facing sides of the first dummy electrode and the first data line may be substantially equal to a distance between facing sides of the connection electrode and the second data line.

A distance between facing sides of the first dummy electrode and the second sub-pixel electrode may be substantially equal to a distance between facing sides of the connection electrode and the second sub-pixel electrode.

At least a portion of the connection electrode may be disposed between the second sub-pixel electrode and the second data line.

The display device may further include: a first shielding line disposed along the first data line and that overlaps the first data line; a second shielding line that intersects the first shielding line; a second shielding line that intersects the first shielding line; a third shielding line disposed along the second data line and that overlaps the second data line and intersects the second shielding line; and a fourth shielding line disposed parallel to the second shielding line that intersects the first shielding line and the third shielding line.

The first sub-pixel electrode, the second sub-pixel electrode, the first switching element and the second switching element may be disposed at an area surrounded by the first, second, third and fourth shielding lines.

The display device may further include a dummy connection electrode that connects the first dummy electrode and the second dummy electrode to each other. The dummy connection electrode may overlap the extension electrode.

The first sub-pixel electrode may have an area that is greater than that of the second sub-pixel electrode.

The display device may further include a second gate line disposed adjacent to the first gate line and that intersects the first data line and the second data line, and a third switching element connected to the second gate line, the connection electrode and a charge sharing capacitor.

A time point of applying a first gate signal to the first gate line may be different from a time point of applying a second gate signal to the second gate line.

According to an exemplary embodiment of the disclosure, a display device includes: a first gate line and a first data line that intersect each other; a second data line that intersects the first gate line and is disposed adjacent to the first data line; a first sub-pixel electrode disposed between the first data line and the second data line; a second sub-pixel electrode disposed between the first gate line and the first sub-pixel electrode; a first switching element connected to the first gate line, the first data line and the first sub-pixel electrode; a second switching element connected to the first gate line, the first data line and the second sub-pixel electrode; a connection electrode that connects the first sub-pixel electrode and the first switching element; a second gate line disposed adjacent to the first gate line and that intersects the first data line and the second data line; and a third switching element connected to the second gate line, the connection electrode and a charge sharing capacitor. A time point of applying a first gate signal to the first gate line may differ from a time point of applying a second gate signal to the second gate line.

The display device may further include a first dummy electrode disposed between the first data line and the second sub-pixel electrode; and a second dummy electrode that extends from the connection electrode and is disposed closer to the first data line than the second data line. An end portion of the first dummy electrode and an end portion of the second dummy electrode may face each other. A distance between facing sides of the first dummy electrode and the first data line may be substantially equal to a distance between facing sides of the second dummy electrode and the first data line. A distance between facing sides of the first dummy electrode and the first data line may be substantially equal to a distance between facing sides of the connection electrode and the second data line. A distance between facing sides of the first dummy electrode and the second sub-pixel electrode may be substantially equal to a distance between facing sides of the connection electrode and the second sub-pixel electrode.

The display device may further include an extension electrode that extends from the first data line and is connected to the first switching element and the second switching element. At least a portion of the extension electrode is disposed between the first dummy electrode and the second dummy electrode, and a distance between facing sides of the first dummy electrode and the extension electrode may differ from a distance between facing sides of the second dummy electrode and the extension electrode.

The display device may further include a first shielding line disposed along the first data line and that overlaps the first data line; a second shielding line that intersects the first shielding line; a third shielding line disposed along the second data line and that overlaps the second data line and intersects the second shielding line; and a fourth shielding line disposed parallel to the second shielding line that intersects the first shielding line and the third shielding line. The first sub-pixel electrode, the second sub-pixel electrode, the first switching element and the second switching element may be disposed at an area surrounded by the first, second, third and fourth shielding lines.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 18 is a table that illustrates effects of exemplary embodiments.

DETAILED DESCRIPTION

Figure 1:
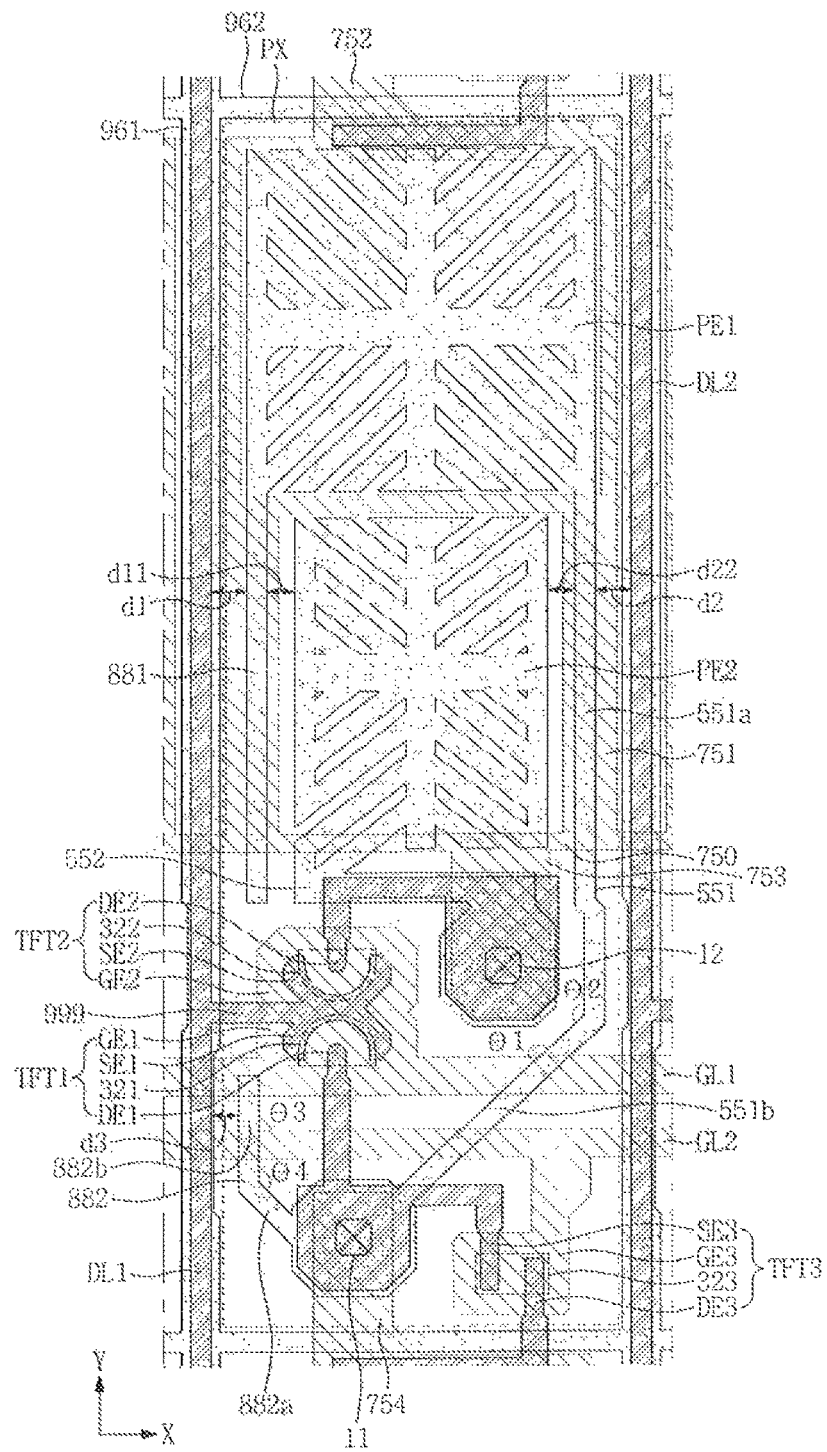
FIG. 1 is a plan view that illustrates a display device according to an exemplary embodiment.

Features of embodiments of the disclosure and methods for achieving them will be made clear from exemplary embodiments described below in detail with reference to the accompanying drawings. Embodiments may, however, have many different forms and should not be construed as being limited to the exemplary embodiments set forth herein. Like reference numerals may refer to like elements throughout the specification.

In the drawings, thicknesses of a plurality of layers and areas may be exaggerated for clarity and ease of description thereof. When a layer, area, or plate is referred to as being "on" another layer, area, or plate, it may be directly on the other layer, area, or plate, or intervening layers, areas, or plates may be present therebetween. Further when a layer, area, or plate is referred to as being "below" another layer, area, or plate, it may be directly below the other layer, area, or plate, or intervening layers, areas, or plates may be present therebetween.

Throughout the specification, when an element is referred to as being "connected" to another element, the element is "directly connected" to the other element, or "electrically connected" to the other element with one or more intervening elements interposed therebetween.

"About" or "approximately" as used herein is inclusive of the stated value and means within an acceptable range of deviation for the particular value as determined by one of ordinary skill in the art, considering the measurement in question and the error associated with measurement of the particular quantity, i.e., the limitations of the measurement system. For example, "about" can mean within one or more standard deviations, or within ±30%, 20%, 10%, 5% of the stated value.

Hereinafter, a display device according to exemplary embodiments will be described in detail with reference to FIGS. 1 to 17.

Figure 2:
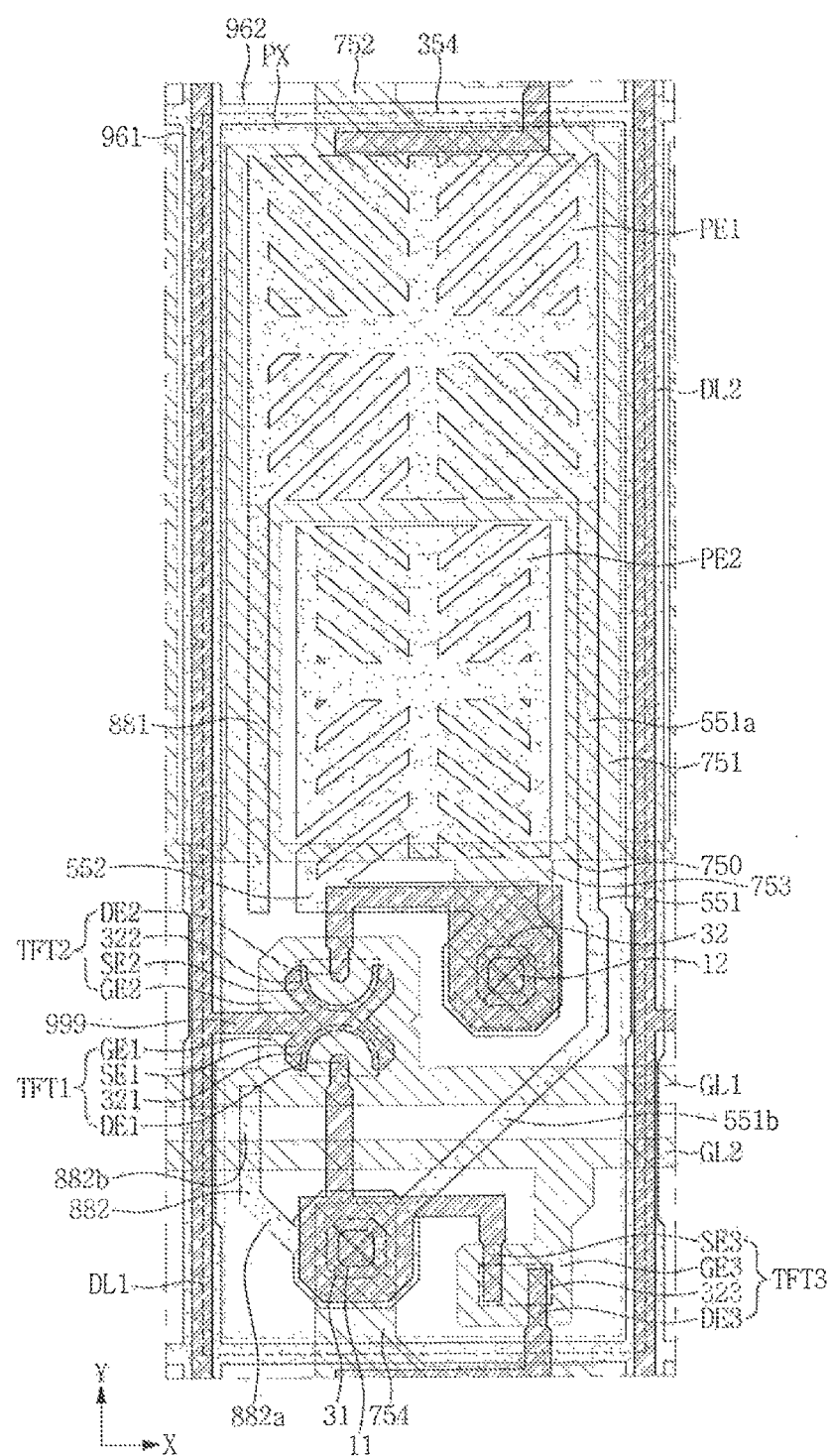
FIG. 2 is a plan view in which a color filter is further added to a structure of FIG. 1.
Figure 3:
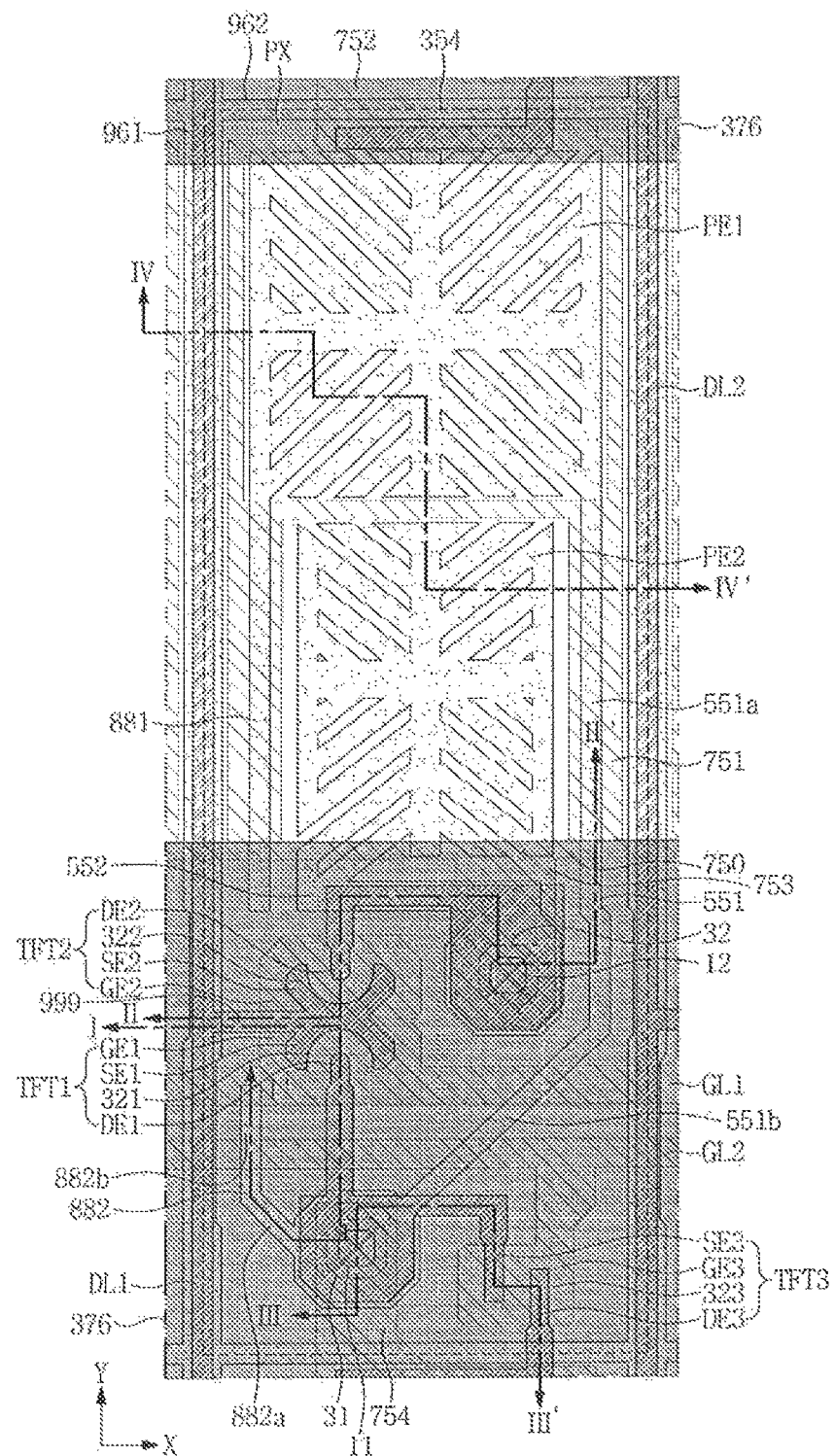
FIG. 3 is a plan view in which a light shielding layer is further added to a structure of FIG. 2.

FIG. 1 is a plan view that illustrates a display device according to an exemplary embodiment, FIG. 2 is a plan view in which a color filter is further added to a structure of FIG. 1, and FIG. 3 is a plan view in which a light shielding layer is further added to a structure of FIG. 2.

Figure 4:
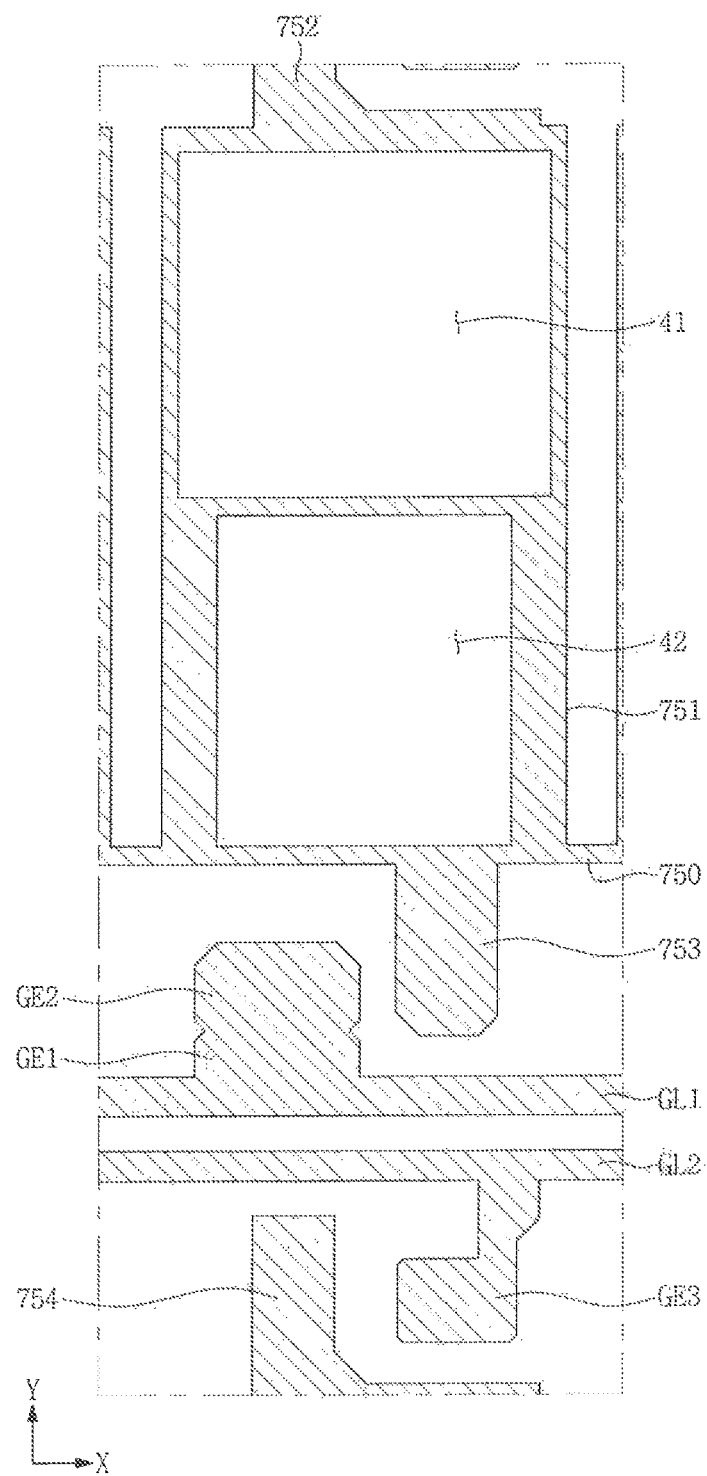
FIGS. 4, 5, 6 and 7 each illustrate main components of FIG. 3.
Figure 5:
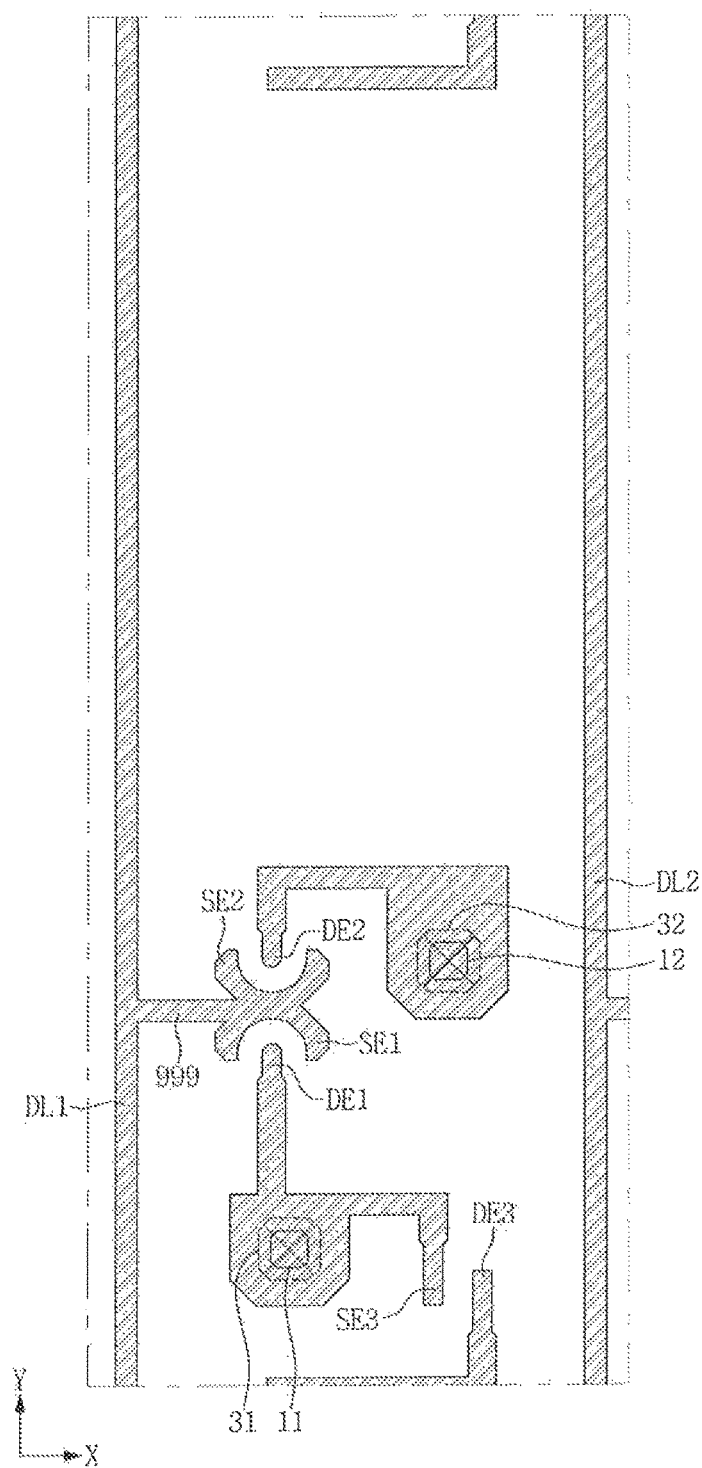
Figure 6:
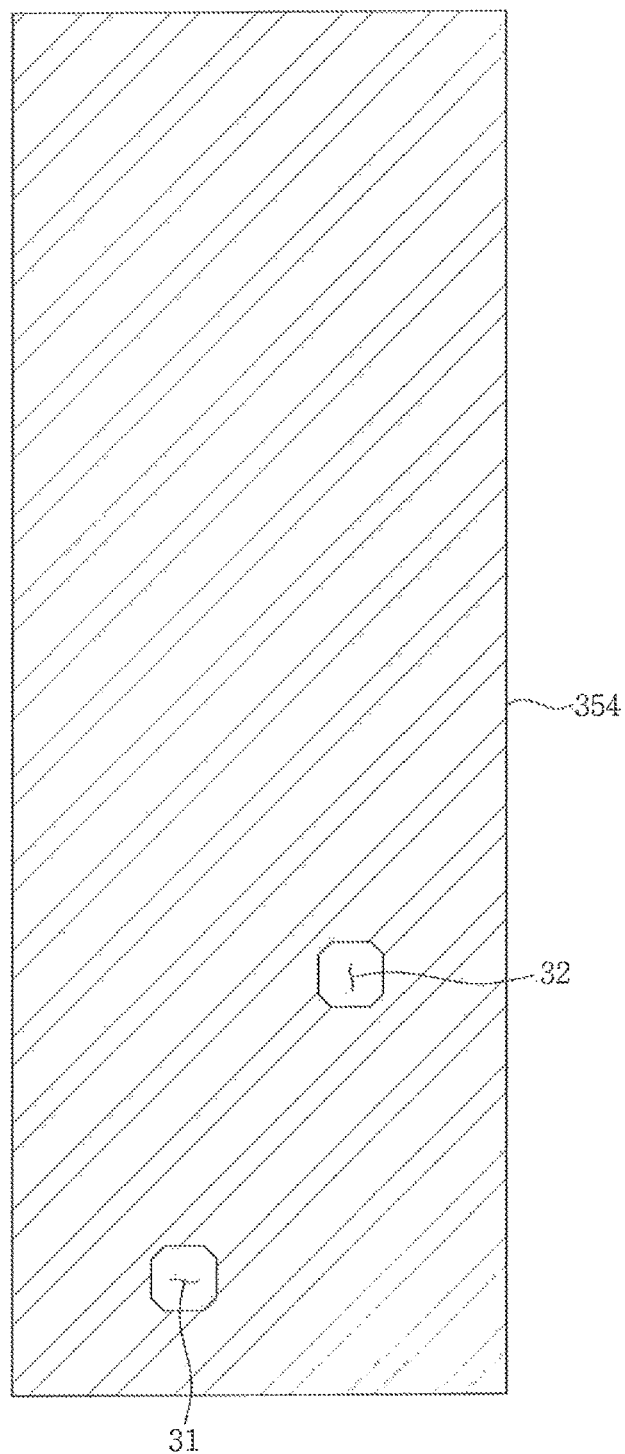
Figure 7:
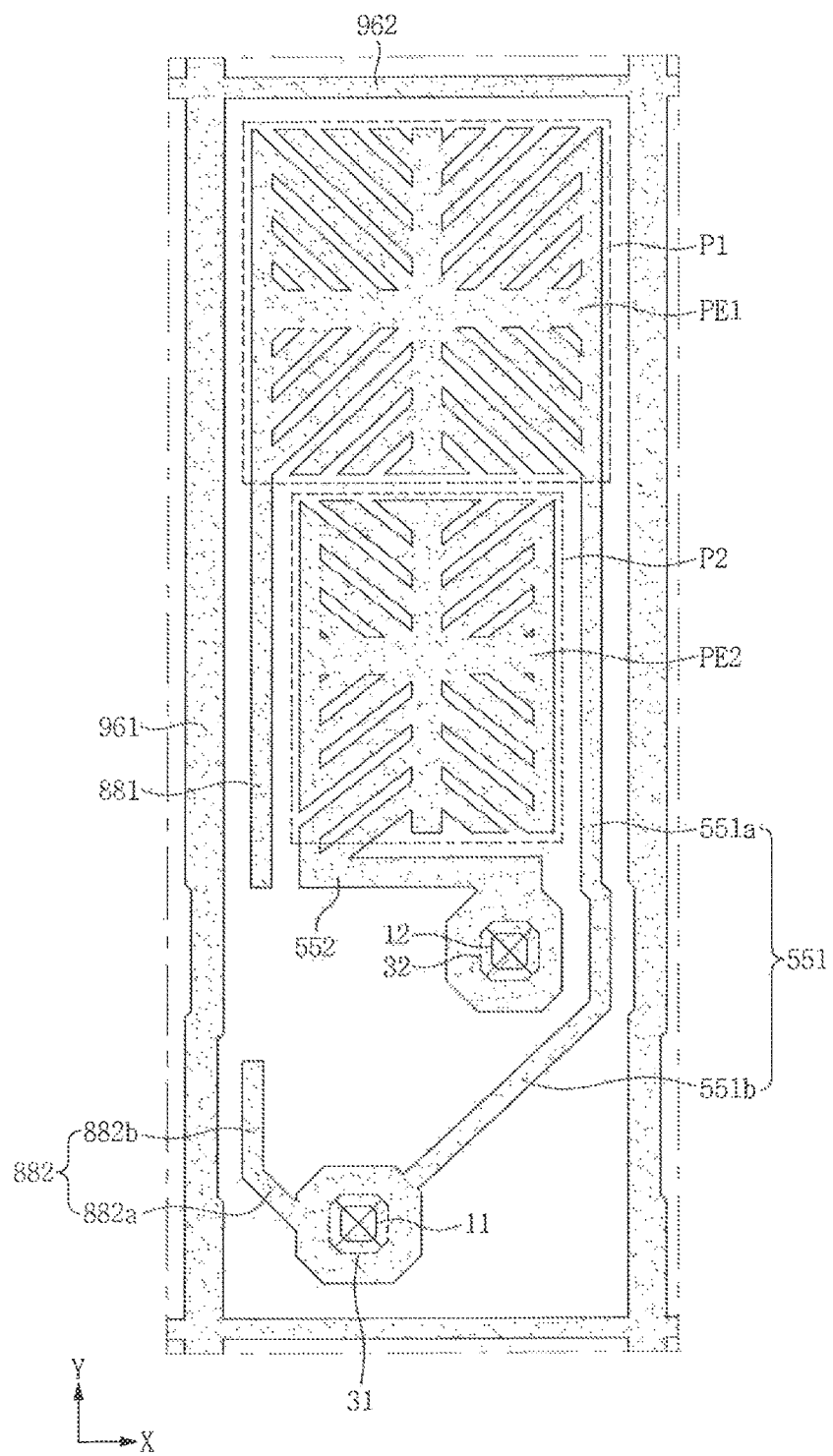

FIGS. 4, 5, 6 and 7 individually illustrate main components of FIG. 3. That is, FIG. 4 illustrates a first gate line, a second gate line, a first gate electrode, a second gate electrode, a third gate electrode, a storage line, a first storage electrode, a second storage electrode, a third storage electrode and a fourth storage electrode of components of FIG. 3. FIG. 5 illustrates a first data line, a second data line, an extension electrode, a first source electrode, a first drain electrode, a second source electrode, a second drain electrode, a third source electrode and a third drain electrode of the components of FIG. 3. FIG. 6 illustrates a color filter of the components of FIG. 3. FIG. 7 illustrates a first sub-pixel electrode, a second sub-pixel electrode, a first connection electrode, a second connection electrode, a first dummy electrode and a second dummy electrode of the components of FIG. 3.

Figure 8:
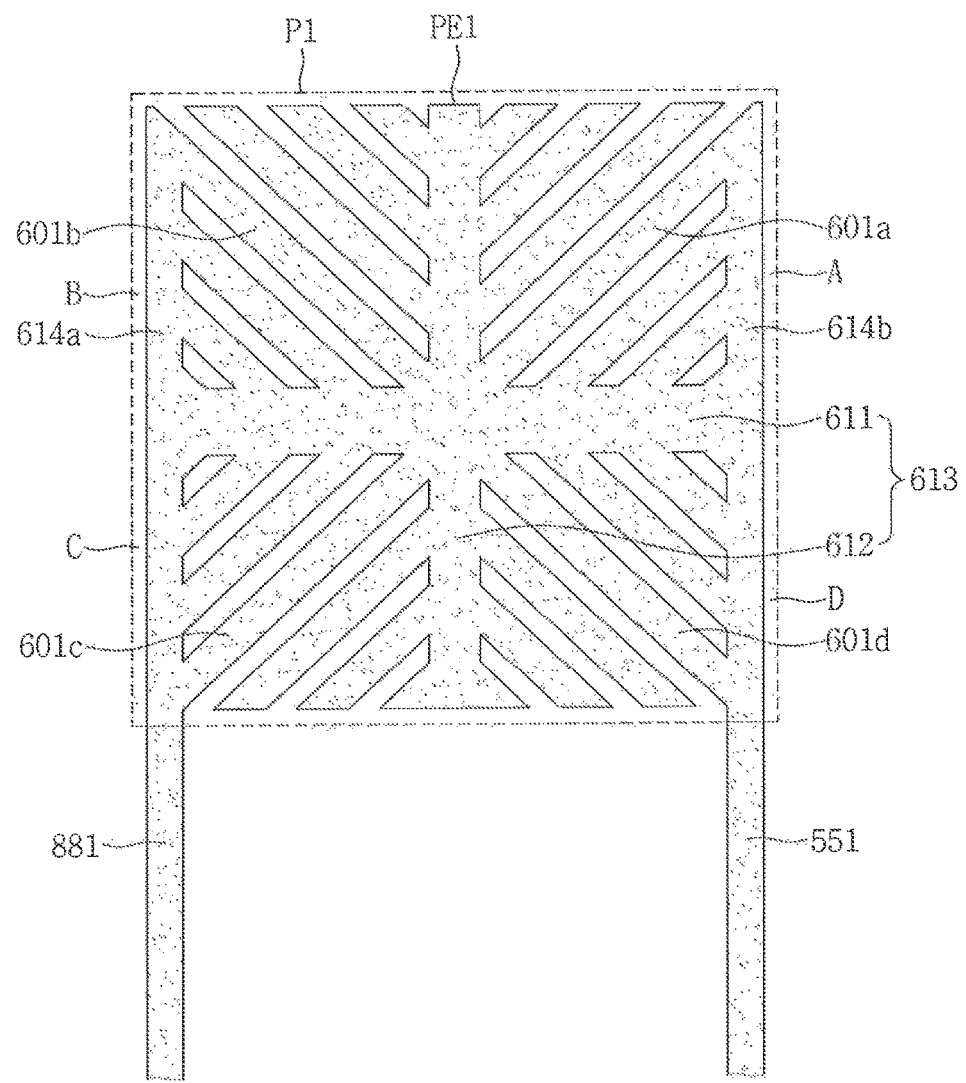
FIG. 8 is an enlarged view of a first sub-pixel electrode of FIG. 7.
Figure 9:
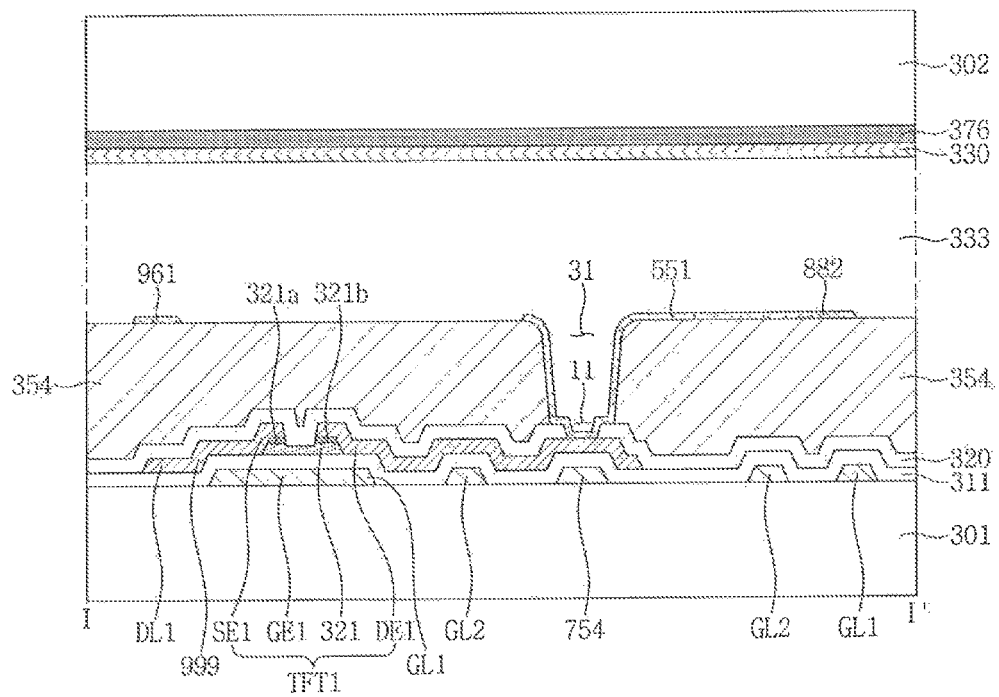
FIG. 9 is a cross-sectional view taken along line I-I' of FIG. 3.
Figure 10:
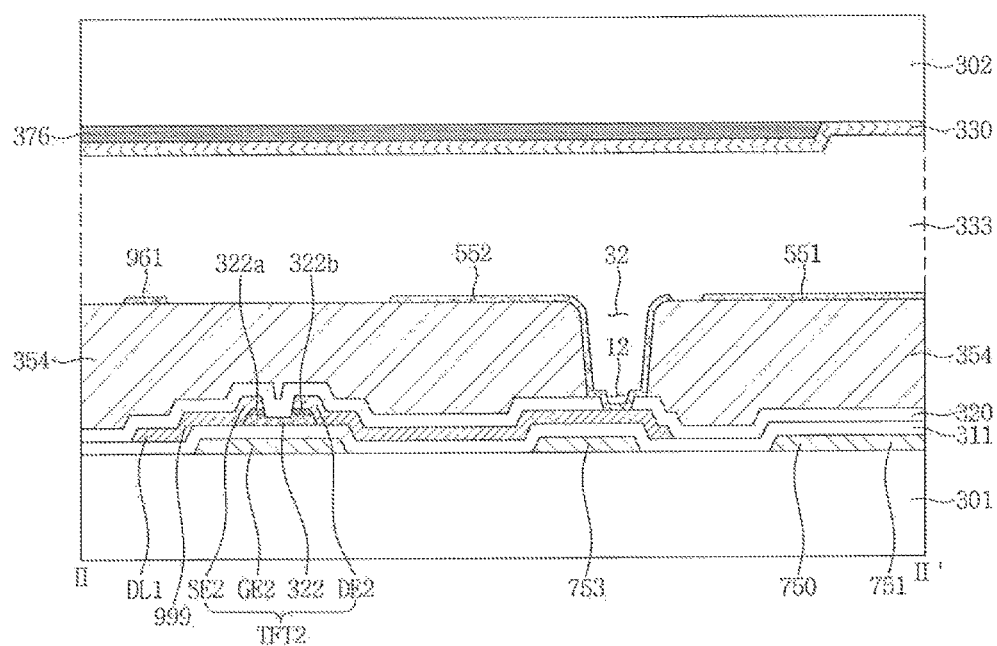
FIG. 10 is a cross-sectional view taken along line II-II' of FIG. 3.
Figure 11:
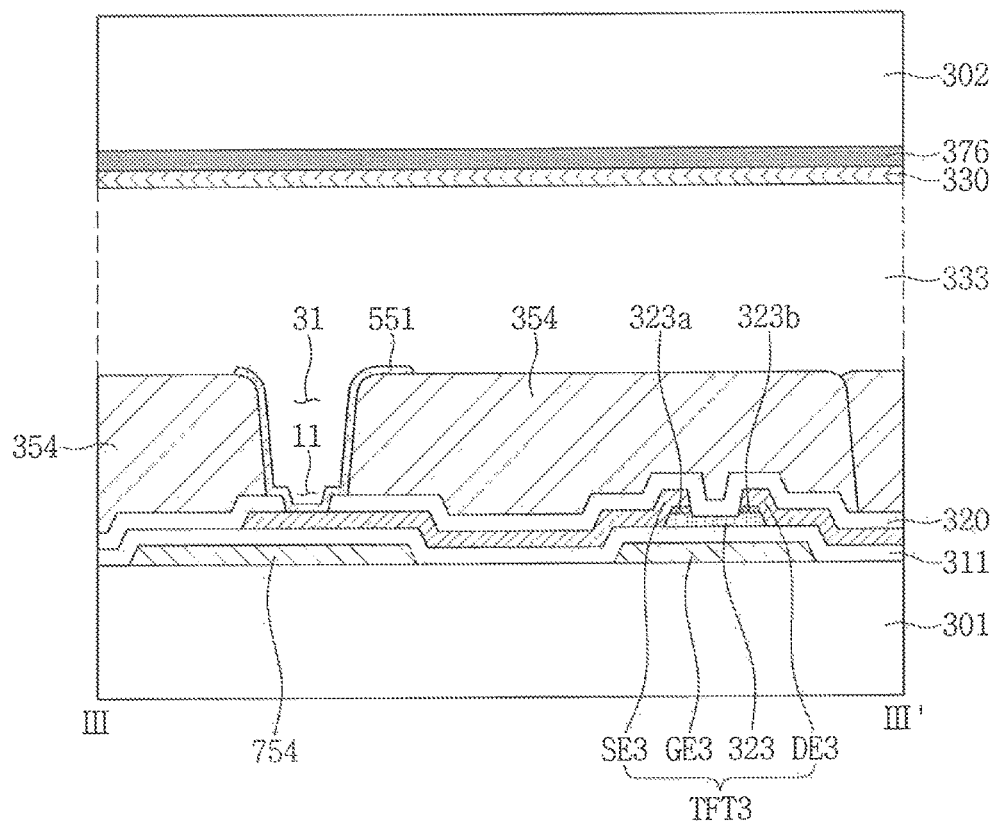
FIG. 11 is a cross-sectional view taken along line III-III' of FIG. 3.
Figure 12:
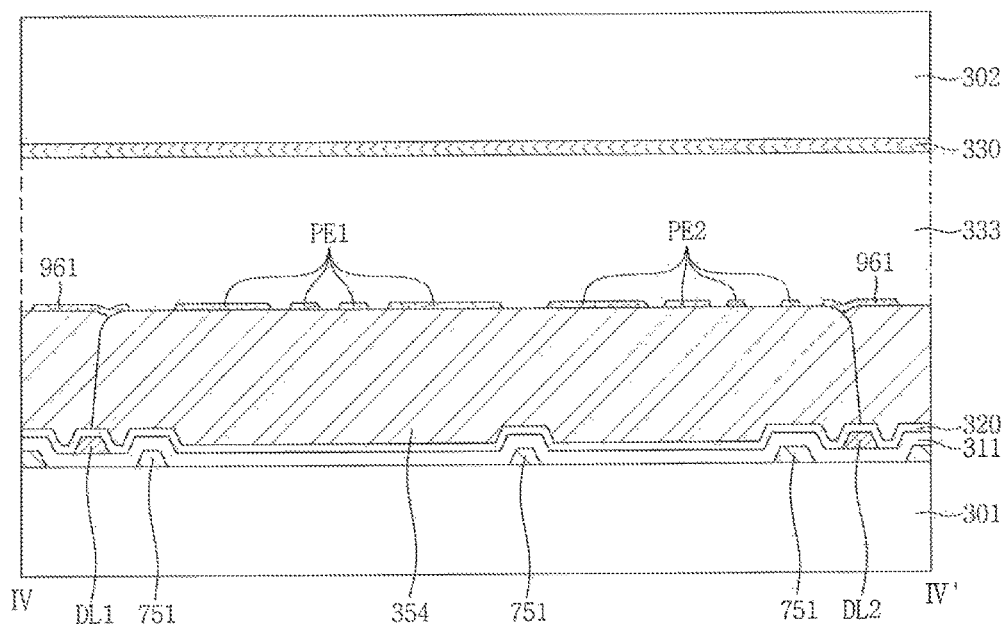
FIG. 12 is a cross-sectional view taken along line IV-IV' of FIG. 3.

FIG. 8 is an enlarged view of the first sub-pixel electrode of FIG. 7, FIG. 9 is a cross-sectional view taken along line I-I' of FIG. 3, FIG. 10 is a cross-sectional view taken along line II-II' of FIG. 3, FIG. 11 is a cross-sectional view taken along line III-III' of FIG. 3, and FIG. 12 is a cross-sectional view taken along line IV-IV' of FIG. 3.

As illustrated in FIGS. 1 to 12, a display device according to an embodiment includes a first substrate 301, a first gate line GL1, a second gate line GL2, a first gate electrode GE1, a second gate electrode GE2, a third gate electrode GE3, a storage line 750, a first storage electrode 751, a second storage electrode 752, a third storage electrode 753, a fourth storage electrode 754, a gate insulating layer 311, a first semiconductor layer 321, a second semiconductor layer 322, a third semiconductor layer 323, a first ohmic contact layer 321a, a second ohmic contact layer 321b, a third ohmic contact layer 322a, a fourth ohmic contact layer 322b, a fifth ohmic contact layer 323a, a sixth ohmic contact layer 323b, a first data line IDL1, a second data line DL2, an extension electrode 999, a first source electrode SE1, a first drain electrode DE1, a second source electrode SE2, a second drain electrode DE2, a third source electrode SE3, a third drain electrode DE3, a protective layer 320, a color filter 354, a first sub-pixel electrode PE1, a second sub-pixel electrode PE2, a first connection electrode 551, a second connection electrode 552, a first dummy electrode 881, a second dummy electrode 882, a second substrate 302, a light shielding layer 376, a common electrode 330 and a liquid crystal layer 333.

As described above, a display device according to an exemplary embodiment is a liquid crystal display ("LCD") device that includes the liquid crystal layer 333.

According to embodiments, of the aforementioned components, the first ohmic contact layer 321a, the second ohmic contact layer 321b, the third ohmic contact layer 322a, the fourth ohmic contact layer 322b, the fifth ohmic contact layer 322a and the sixth ohmic contact layer 323b may be omitted from a display device.

According to embodiments, a display device includes a plurality of pixels PX. A pixel PX includes a first switching element TFT1, a second switching element TFT2, a third switching element TFT3, the color filter 354, the first sub-pixel electrode PE1, the second sub-pixel electrode PE2, the common electrode 330 and the liquid crystal layer 333.

According to embodiments, as illustrated in FIGS. 1 and 9, the first switching element TFT1 includes the first gate electrode GE1, the first semiconductor layer 321, the first source electrode SE1 and the first drain electrode DE1.

According to embodiments, as illustrated in FIGS. 1 and 10, the second switching element TFT2 includes the second gate electrode GE2, the second semiconductor layer 322, the second source electrode SE2 and the second drain electrode DE2.

According to embodiments, as illustrated in FIGS. 1 and 11, the third switching element TFT3 includes the third gate electrode GE3, the third semiconductor layer 323, the third source electrode SE3 and the third drain electrode DE3.

According to embodiments, as illustrated in FIG. 1, each of the first gate line GL1 and the second gate line GL2 extends in a direction parallel to an X axis, hereinafter, "an X-axis direction". As illustrated in FIG. 9, the first gate line GL1 and the second gate line GL2 are disposed on the first substrate 301.

According to embodiments, as illustrated in FIGS. 1 and 4, the first gate line GL1 is connected to the first gate electrode GE1 and the second gate electrode GE2. The first gate line GL, the first gate electrode GE1 and the second gate electrode GE2 may all be formed integrally.

According to embodiments, for connection to another layer or an external driving circuit, an end portion of the first gate line GL1 has an area that is greater than that of another portion of the first gate line GL1. Similarly, for connection to another layer or an external driving circuit, an end portion of the second gate line GL2 has an area that is greater than that of another portion of the second gate line GL2.

According to embodiments, the first gate line GL1 includes one of: aluminum (Al) or alloys thereof, silver (Ag) or alloys thereof, copper (Cu) or alloys thereof, or molybdenum (Mo) or alloys thereof. In addition, the first gate line GL1 includes one of: chromium (Cr), tantalum (Ta), or titanium (Ti). In an exemplary embodiment, the first gate line GL1 has a multilayer structure that includes at least two conductive layers that have different physical properties.

According to embodiments, the second gate line GL2 includes substantially the same materials and has substantially the same structure, i.e., a multilayer structure, as the first gate line GL1. The second gate line GL2 and the first gate line GL1 are simultaneously formed in substantially a same process.

According to embodiments, as illustrated in FIGS. 1 and 4, the first gate electrode GE1 has a shape that protrudes from the first gate line GL1. For example, the first gate electrode GE1 protrudes from the first gate line GL1 in a direction parallel to a Y axis, hereinafter, "a Y-axis direction". The first gate electrode GE1 is part of the first gate line GL1. The first gate electrode GE1 includes substantially the same materials and has substantially the same structure, i.e., a multilayer structure, as the first gate line GL1. The first gate electrode GE1 and the first gate line GL1 are simultaneously formed in substantially a same process.

According to embodiments, as illustrated in FIGS. 1 and 4, the second gate electrode GE2 has a shape that protrudes from the first gate electrode GE1. For example, the second gate electrode GE2 protrudes from the first gate electrode GE1 in the Y-axis direction. The second gate electrode GE2 may be a part of the first gate electrode GE1 or a part of the first gate line GL1. The second gate electrode GE2 includes substantially the same materials and has substantially the same structure, i.e., a multilayer structure, as the first gate line GL1. The second gate electrode GE2 and the first gate line GL1 are simultaneously formed in substantially a same process.

According to embodiments, as illustrated in FIGS. 1 and 4, the third gate electrode GE3 has a shape that protrudes from the second gate line GL2. For example, the third gate electrode GE3 protrudes from the second gate line GL2 in the Y-axis direction. The third gate electrode GE3 is a part of the second gate line GL2. The third gate electrode GE3 includes substantially the same materials and has a substantially the same structure, i.e., a multilayer structure, as the first gate line GL1. The third gate electrode GE3 and the first gate line GL1 are simultaneously formed in substantially a same process.

According to embodiments, in FIG. 1 or 4, letting a surface of the first gate line GL1 that faces the second gate line GL2 be defined as a first adjacent surface and a surface of the second gate line GL2 that faces the first adjacent surface be defined as a second adjacent surface, the first gate electrode GE1 and the second gate electrode GE2 described above protrude from a surface of the first gate line GL1 that is opposite from the first adjacent surface and the third gate electrode GE3 protrudes from a surface of the second gate line GL2 that is opposite from the second adjacent surface.

According to embodiments, as illustrated in FIGS. 1 and 4, the storage line 750 extends in the X-axis direction. The storage line 750 receives a storage voltage from a power supply. The storage voltage is substantially the same as a common voltage of the common electrode 330.

According to embodiments, for connection to another layer or an external drive circuit, an end portion of the storage line 750 has an area that is greater than an area of other portions of the storage line 750.

According to embodiments, the first storage electrode 751, the second storage electrode 752 and the third storage electrode 753 protrude from the storage line 750. The storage line 750, the first storage electrode 751, the second storage electrode 752 and the third storage electrode 753 may all be formed integrally. The storage line 750, the first storage electrode 751, the second storage electrode 752 and the third storage electrode 753 include substantially the same materials and have substantially the same structure, i.e. a multilayer structure, as the first gate line GL1. The storage line 750, the first storage electrode 751, the second storage electrode 752, the third storage electrode 753 and the first gate line GL1 are simultaneously formed in substantially a same process.

According to embodiments, as illustrated in FIGS. 1 and 4, the first storage electrode 751 protrudes in the Y-axis direction from the storage line 750. The first storage electrode 751 has at least one hole. For example, as illustrated in FIG. 4, the first storage electrode 751 has a first hole 41 and a second hole 42. The first hole 41 and the second hole 42 may have different sizes. For example, the first hole 41 is larger than the second hole 42.

According to embodiments, the first hole 41 of the first storage electrode 751 surrounds a part of the first sub-pixel electrode PE1 and the second hole 42 of the first storage electrode 751 surrounds a part of the second sub-pixel electrode PE2. For example, a portion of the first sub-pixel electrode PE1, except one edge thereof, is surrounded by the first hole 41, and a portion of the second sub-pixel electrode PE2, except one edge thereof, is surrounded by the second hole 42.

According to embodiments, the second storage electrode 752 protrudes from the first storage electrode 751 in the Y-axis direction. At least a portion of the second storage electrode 752 included in a first pixel is disposed at second pixel adjacent to the first pixel PX. The second pixel is disposed in a protruding direction of the first storage electrode 751 of the first pixel PX, such as an upward direction of the pixel PX in FIG. 1, and the second pixel and the first pixel PX are connected in common to a same data line, such as the first data line DL1.

According to embodiments, the third storage electrode 753 protrudes from the storage line 750 in the Y-axis direction. The third storage electrode 753 protrudes in a direction opposite to the first storage electrode 751. That is, the third storage electrode 753 protrudes toward the first gate line GL1.

According to embodiments, as illustrated in FIG. 1, the fourth storage electrode 754 is disposed closer to the third gate electrode GE3 and the second gate line GL2 than to the first gate line GL1. The fourth storage electrode 754 of the first pixel PX is a part of the second storage electrode of a third pixel adjacent to the first pixel. The third pixel is disposed in a protruding direction of the third storage electrode 753 of the first pixel PX, such as a downward direction of the pixel PX in FIG. 1, and the third pixel and the first pixel PX are connected in common to a same data line, such as the first data line DL1.

According to embodiments, each of the first, second, third and fourth storage electrodes 751, 752, 753 and 754 include substantially the same materials and have substantially the same structure. i.e., a multilayer structure, as the first gate line GL1. The first, second, third and fourth storage electrodes 751, 752, 753 and 754 and the first gate line GL1 are simultaneously formed in substantially a same process.

According to embodiments, as illustrated in FIGS. 4 and 9-12, the gate insulating layer 311 is disposed on the first gate line GL1, the second gate line GL2, the first gate electrode GE1, the second gate electrode GE2, the third gate electrode GE3, the storage line 750, the first storage electrode 751, the second storage electrode 752, the third storage electrode 753 and the fourth storage electrode 754. The gate insulating layer 311 is disposed over an entire surface of the first substrate 301, including the first gate line GL1, the second gate line GL2, the first gate electrode GE1, the second gate electrode GE2, the third gate electrode GE3, the storage line 750, the first storage electrode 751, the second storage electrode 752, the third storage electrode 753 and the fourth storage electrode 754. The gate insulating layer 311 includes silicon nitride (SiNx), silicon oxide (SiOx), etc. The gate insulating layer 311 has a multilayer structure that includes at least two insulating layers having different physical properties.

According to embodiments, as illustrated in FIGS. 1 and 9, the first semiconductor layer 321 overlaps the first gate electrode GE1, the first source electrode SE1 and the first drain electrode DE1. In addition, as illustrated in FIG. 9, the first semiconductor layer 321 is disposed on the gate insulating layer 311. The first semiconductor layer 321 includes amorphous silicon, polycrystalline silicon, etc.

According to embodiments, as illustrated in FIGS. 1 and 10, the second semiconductor layer 322 overlaps the second gate electrode GE2, the second source electrode SE2 and the second drain electrode DE2. In addition, as illustrated in FIG. 10, the second semiconductor layer 322 is disposed on the gate insulating layer 311. The second semiconductor layer 322 includes substantially the same materials as the first semiconductor layer 321. The second semiconductor layer 322 and the first semiconductor layer 311 are formed simultaneously in substantially a same process.

According to embodiments, as illustrated in FIGS. 1 and 11, the third semiconductor layer 323 overlaps the third gate electrode GE3, the third source electrode SE3 and the third drain electrode DE3. In addition, as illustrated in FIG. 11, the third semiconductor layer 323 is disposed on the gate insulating layer 311. The third semiconductor layer 323 includes substantially the same materials as the first semiconductor layer 321. The third semiconductor layer 323 and the first semiconductor layer 311 are formed simultaneously in substantially a same process.

According to embodiments, as illustrated in FIGS. 1 and 5, each of the first data line DL1 and the second data line DL2 extends in the Y-axis direction. The second data line DL2 is parallel to the first data line DL1. As illustrated in FIG. 1, the first data line DL1 and the second data line DL2 intersect the first gate line GL1, the second gate line GL2 and the storage line 750 described above.

According to embodiments, portions of the first data line DL1 at an intersection of the first data line DL1 and the first gate line GL1 are wider than other portions of the first data line DL1. In addition, portions of the first data line DL1 at an intersection of the first data line DL1 and the second gate line GL2 are wider than other portions thereof. In addition, portions of the first data line DL1 at an intersection of the first data line DL1 and the storage line 75 are wider than other portions thereof.

Similarly, according to embodiments, portions of the second data line DL2 at an intersection of the second data line DL2 and the first gate line GL1 are wider than other portions of the second data line DL2. In addition, portions of the second data line DL2 at an intersection of the second data line DL2 and the second gate line GL2 are wider than other portions thereof. In addition, portions of the second data line DL2 at an intersection of the second data line DL2 and the storage line 750 are wider than other portions thereof.

According to embodiments, for connection to another layer or an external driving circuit, an end portion of the first data line DL1 has an area greater than that of other portions thereof. Similarly, for connection to another layer or an external driving circuit, an end portion of the second data line DL2 has an area greater than that of other portions thereof.

Accordingly, according to embodiments, a parasitic capacitance between the data lines DL1 and DL2 and the gate lines GL1 and GL2, and a parasitic capacitance between the data lines DL1 and DL2 and the storage line 750 can be reduced.

According to embodiments, as illustrated in FIG. 12, each of the first data line DL1 and the second data line DL2 is disposed on the gate insulating layer 311.

According to embodiments, the first data line DL1 includes a refractory metal such as molybdenum, chromium, tantalum and titanium, or an alloy thereof. The first data line DL1 has a multilayer structure that includes the refractory metal layer and a low resistance conductive layer. Examples of the multilayer structure include: a double-layer structure that includes a chromium or molybdenum (alloy) lower layer and an aluminum (alloy) upper layer; or a triple-layer structure that includes a molybdenum (alloy) lower layer, an aluminum (alloy) intermediate layer, and a molybdenum (alloy) upper layer. In an exemplary embodiment, the first data line DL1 includes any other suitable metal or conductor rather than the aforementioned materials.

According to embodiments, the second data line DL2 includes substantially the same materials and has substantially the same structure, i.e., a multilayer structure, as the first data line DL1. The second data line DL2 and the first data line DL1 are simultaneously formed in substantially a same process.

According to embodiments, as illustrated in FIG. 1, the extension electrode 999 protrudes in the X-axis direction from the first data line DL1. At least a portion of the extension electrode 999 overlaps the first gate electrode GE1 and the second gate electrode GE2. The extension electrode 999 may be formed integrally with the first data line DL1. The extension electrode 999 is a part of the first data line DL1.

According to embodiments, at least a portion of the extension electrode 999 is disposed between the first dummy electrode 881 and the second dummy electrode 882.

According to embodiments, as illustrated in FIGS. 1 and 9, the first source electrode SE1 overlaps the first gate electrode GE1 and the first semiconductor layer 321. In addition, as illustrated in FIG. 9, the first source electrode SE1 is disposed on the gate insulating layer 311 and the first semiconductor layer 321.

According to embodiments, the first source electrode SE1 protrudes from the extension electrode 999 toward the first drain electrode DE1. The first source electrode SE1 may be integrally formed with the extension electrode 999. The first source electrode SE1 is a part of the extension electrode 999.

According to embodiments, the first source electrode SE1 has a U-like shape. The first source electrode SE1 includes substantially the same materials and has substantially the same structure, i.e., a multilayer structure, as the first data line DL1. The first source electrode SE1 and the first data line DL1 are simultaneously formed in substantially a same process.

According to embodiments, as illustrated in FIGS. 1 and 9, the first drain electrode DE1 is disposed on the gate insulating layer 311 and the first semiconductor layer 321, spaced apart from the first source electrode SE1 by a predetermined distance. The first drain electrode DE1 overlaps the first semiconductor layer 321 and the first gate electrode GE1. A channel area of the first switching element TFT1 is positioned at a portion of the first semiconductor layer 321 between the first drain electrode DE1 and the first source electrode SE1.

According to embodiments, the first drain electrode DE1 has an I-like shape. The first drain electrode DE1 includes substantially the same materials and has substantially the same structure, i.e., a multilayer structure, as the first data line DL1. The first drain electrode DE1 and the first data line DL1 are simultaneously formed in substantially a same process.

According to embodiments, as illustrated in FIGS. 1 and 10, the second source electrode SE2 overlaps the second gate electrode GE2 and the second semiconductor layer 322. In addition, as illustrated in FIG. 10, the second source electrode SE2 is disposed on the gate insulating layer 311 and the second semiconductor layer 322.

According to embodiments, the second source electrode SE2 protrudes from the extension electrode 999 toward the second drain electrode DE2. The second source electrode SE2 may be integrally formed with the extension electrode 999 and the first source electrode SE1. The second source electrode SE2 is part of the extension electrode 999.

According to embodiments, second source electrode SE2 has a U-like shape. A shape of the second source electrode SE2 is inverted 180 degrees with respect to the shape of the first source electrode SE1. The second source electrode SE2 includes substantially same materials and has substantially the same structure, i.e., a multilayer structure, as the first data line DL1. The second source electrode SE2 and the first data line DL1 are simultaneously formed in substantially a same process.

According to embodiments, as illustrated in FIGS. 1 and 10, the second drain electrode DE2 is disposed on the gate insulating layer 311 and the second semiconductor layer 322, spaced apart from the second source electrode SE2 by a predetermined distance. The second drain electrode DE2 overlaps the second semiconductor layer 322 and the second gate electrode GE2. A channel area of the second switching element TFT2 is positioned at a portion of the second semiconductor layer 322 between the second drain electrode DE2 and the second source electrode SE2.

According to embodiments, the second drain electrode DE2 has an I-like shape. The second drain electrode DE2 includes substantially the same materials and has substantially the same structure, i.e., a multilayer structure, as the first data line DL1. The second drain electrode DE2 and the first data line DL1 are simultaneously formed in substantially a same process.

According to embodiments, as illustrated in FIGS. 1 and 11, the third source electrode SE3 overlaps the third gate electrode GE3 and the third semiconductor layer 323. In addition, as illustrated in FIG. 11, the third source electrode SE3 is disposed on the gate insulating layer 311 and the third semiconductor layer 323.

According to embodiments, the third source electrode SE3 protrudes from the second drain electrode DE2 toward the third gate electrode GE3. The third source electrode SE3 may be integrally formed with the second drain electrode DE2.

According to embodiments, the third source electrode SE3 has an I-like shape. The third source electrode SE3 includes substantially the same materials and has substantially the same structure, i.e., a multilayer structure, as the first data line DL1. The third source electrode SE3 and the first data line DL1 are simultaneously formed in substantially a same process.

According to embodiments, as illustrated in FIGS. 1 and 11, the third drain electrode DE3 is disposed on the gate insulating layer 311 and the third semiconductor layer 323, spaced apart from the third source electrode SE3 by a predetermined distance. The third drain electrode DE3 overlaps the third semiconductor layer 323 and the third gate electrode GE3. A channel area of the third switching element TFT3 is positioned at a portion of the third semiconductor layer 323 between the third drain electrode DE3 and the third source electrode SE3.

According to embodiments, the third drain electrode DE3 has an I-like shape. A portion of the third drain electrode DE3 is disposed at another pixel. For example, the third drain electrode of the first pixel overlaps a first storage electrode and a second storage electrode of the third pixel. The third drain electrode DE3 includes substantially the same materials and has substantially the same structure, i.e., a multilayer structure, as the first data line DL1. The third drain electrode DE3 and the first data line DL1 are simultaneously formed in substantially a same process.

According to embodiments, the first ohmic contact layer 321a is disposed between the first semiconductor layer 321 and the first source electrode SE1. The first ohmic contact layer 321a lowers an interfacial resistance between the first semiconductor layer 321 and the first source electrode SE1.

According to embodiments, the first ohmic contact layer 321a includes silicide or n+ hydrogenated amorphous silicon doped with n-type impurity ions, e.g., phosphorus (P) or phosphine ($PH_3$), at high concentration.

According to embodiments, the second ohmic contact layer 321b is between the first semiconductor layer 321 and the first drain electrode DE1. The second ohmic contact layer 321b lowers an interfacial resistance between the first semiconductor layer 321 and the first drain electrode DE1. The second ohmic contact layer 321b includes substantially the same materials and has substantially the same structure, i.e., a multilayer structure, as the first ohmic contact layer 321a. The second ohmic contact layer 321b and the first ohmic contact layer 321a are simultaneously formed in substantially a same process.

According to embodiments, the third ohmic contact layer 322a is disposed between the second semiconductor layer 322 and the second source electrode SE2. The third ohmic contact layer 322a lowers an interfacial resistance between the second semiconductor layer 322 and the second source electrode SE2. The third ohmic contact layer 322a includes substantially the same materials and has substantially the same structure, i.e., a multilayer structure, as the first ohmic contact layer 321a. The third ohmic contact layer 322a and the first ohmic contact layer 321a are simultaneously formed in substantially a same process.

According to embodiments, the fourth ohmic contact layer 322b is disposed between the second semiconductor layer 322 and the second drain electrode DE2. The fourth ohmic contact layer 322b lowers an interfacial resistance between the second semiconductor layer 322 and the second drain electrode DE2. The fourth ohmic contact layer 322b includes substantially the same materials and has substantially the same structure, i.e., a multilayer structure, as the first ohmic contact layer 321a. The fourth ohmic contact layer 322b and the first ohmic contact layer 321a are simultaneously formed in substantially a same process.

According to embodiments, the fifth ohmic contact layer 323a is disposed between the third semiconductor layer 323 and the third source electrode SE3. The fifth ohmic contact layer 323a lowers an interfacial resistance between the third semiconductor layer 323 and the third source electrode SE3. The fifth ohmic contact layer 323a includes substantially the same materials and has substantially the same structure, i.e., a multilayer structure, as the first ohmic contact layer 321a. The fifth ohmic contact layer 323a and the first ohmic contact layer 321a are simultaneously formed in substantially a same process.

According to embodiments, the sixth ohmic contact layer 323b is disposed between the third semiconductor layer 323 and the third drain electrode DE3. The sixth ohmic contact layer 323b lowers an interfacial resistance between the third semiconductor layer 323 and the third drain electrode DE3. The sixth ohmic contact layer 323b includes substantially the same materials and has substantially the same structure, i.e., a multilayer structure, as the first ohmic contact layer 321a. The sixth ohmic contact layer 323b and the first ohmic contact layer 321a are simultaneously formed in substantially a same process.

According to embodiments, a first additional semiconductor layer is further disposed between the gate insulating layer 311 and the first source electrode SE1. In addition, a second additional semiconductor layer is further disposed between the gate insulating layer 311 and the first drain electrode DE1. In addition, a third additional semiconductor layer is further disposed between the gate insulating layer 311 and the second source electrode SE2. In addition, a fourth additional semiconductor layer is further disposed between the gate insulating layer 311 and the second drain electrode DE2. In addition, a fifth additional semiconductor layer is further disposed between the gate insulating layer 311 and the third source electrode SE3. In addition, a sixth additional semiconductor layer is further disposed between the gate insulating layer 311 and the third drain electrode DE3. In addition, a seventh additional semiconductor layer is further disposed between the gate insulating layer 311 and the first data line DL1. In addition, an eighth additional semiconductor layer is further disposed between the gate insulating layer 311 and the second data line DL2. In addition, a ninth additional semiconductor layer is further disposed between the gate insulating layer 311 and the extension electrode 999.

In addition, according to embodiments, an ohmic contact layer is further disposed between the first additional semiconductor layer and the first source electrode SE1, an ohmic contact layer is further disposed between the second additional semiconductor layer and the first drain electrode DE1, an ohmic contact layer is further disposed between the third additional semiconductor layer and the second source electrode SE2, an ohmic contact layer is further disposed between the fourth additional semiconductor layer and the second drain electrode DE2, an ohmic contact layer is further disposed between the fifth additional semiconductor layer and the third source electrode SE3, an ohmic contact layer is further disposed between the sixth additional semiconductor layer and the third drain electrode DE3, an ohmic contact layer may be further disposed between the seventh additional semiconductor layer and the first data line DL1, an ohmic contact layer is further disposed between the eighth additional semiconductor layer and the second data line DL2 and an ohmic contact layer is further disposed between the ninth additional semiconductor layer and the extension electrode 999.

According to embodiments, as illustrated in FIGS. 9, 10, 11 and 12, the protective layer 320 is disposed on the gate insulating layer 311, the first data line DL1, the second data line DL2, the extension electrode 999, the first source electrode SE1, the second source electrode SE2, the third source electrode SE3, the first drain electrode DE1, the second drain electrode DE2 and the third drain electrode DE3. The protective layer 320 is disposed over an entire surface of the first substrate 301, including the gate insulating layer 311, the first data line DL1, the second data line DL2, the extension electrode 999, the first source electrode SE, the second source electrode SE2, the third source electrode SE3, the first drain electrode DE1, the second drain electrode DE2 and the third drain electrode DE3.

According to embodiments, the protective layer 320 has a first drain contact hole 11 and a second drain contact hole 12 passing therethrough. The first drain contact hole 11 of the protective layer 320 corresponds to the first drain electrode DE1 and the second drain contact hole 12 of the protective layer 320 corresponds to the second drain electrode DE2.

According to embodiments, the protective layer 320 includes an inorganic insulating material such as silicon nitride ($SiN_x$) or silicon oxide ($SiO_x$), and a photosensitive inorganic insulating material with a dielectric constant of about 4.0 is used. The protective layer 320 has a double-layer structure that includes a lower inorganic layer and an upper organic layer. The protective layer 320 has a thickness greater than or equal to about 5000 Å, e.g., in a range of about 6000 Å to about 8000 Å.

According to embodiments, as illustrated in FIG. 2, the color filter 354 is disposed in an area surrounded by a first shielding line 961 and a second shielding line 962 that intersect each other. An edge of the color filter 354 is disposed on the first shielding line 961 and the second shielding line 962. In addition, as illustrated in FIGS. 9, 10, 11 and 12, the color filter 354 is disposed on the protective layer 320.

According to embodiments, as illustrated in FIGS. 6, 9 and 10, the color filter 354 has a first drain contact hole 31 and a second drain contact hole 32. The first drain contact hole 31 of the color filter 354 corresponds to the first drain contact hole 11 of the protective layer 320 and the second drain contact hole 32 of the color filter 354 corresponds to the second drain contact hole 12 of the protective layer 320.

According to embodiments, a part of the first drain electrode DE1 and a part of the third source electrode SE3 are exposed through the first drain contact hole 31 and the first drain contact hole 11, and a part of the second drain electrode DE2 is exposed through the second drain contact hole 32 and the second drain contact hole 12.

According to embodiments, the first drain contact hole 31 of the color filter 354 is larger than the first drain contact hole 11 of the protective layer 320. For example, a diameter of the first drain contact hole 31 is larger than a diameter of the first drain contact hole 11. As illustrated in FIG. 2, the first drain contact hole 31 of the color filter 354 surrounds the first drain contact hole 11 of the protective layer 320.

According to embodiments, the second drain contact hole 32 of the color filter 354 is larger than the second drain contact hole 12 of the protective layer 320. For example, a diameter of the second drain contact hole 32 is larger than a diameter of the second drain contact hole 12. As illustrated in FIG. 2, the second drain contact hole 32 of the color filter 354 surrounds the second drain contact hole 12 of the protective layer 320.

According to embodiments, as illustrated in FIG. 7, the first sub-pixel electrode PE1 is disposed in a first sub-pixel area P1. The first sub-pixel area P1 includes an area defined by the first hole 41 of the first storage electrode 751 described above. For example, in addition to the area defined by the first hole 41, the first sub-pixel area P1 further includes an overlap area of the first storage electrode 751 and the first sub-pixel electrode PE1 of FIG. 1.

According to embodiments, as illustrated in FIG. 1, at least a portion of the first sub-pixel electrode PE1 is disposed at the first hole 41 of the aforementioned first storage electrode 751. For example, a portion of the first sub-pixel electrode PE1, except one edge thereof, is disposed at the first hole 41. One edge of the first sub-pixel electrode PE1 overlaps the first storage electrode 751. In addition, as illustrated in FIG. 12, the first sub-pixel electrode PE1 is disposed on the color filter 354.

According to embodiments, the first sub-pixel electrode PE1 is connected to the first switching element TFT1 and the third switching element TFT3 through the first connection electrode 551. In other words, the first connection electrode 551 electrically connects the first sub-pixel electrode PE1 and the first drain electrode DE1 of the first switching element TFT1. In addition, the first connection electrode 551 electrically connects the first sub-pixel electrode PE1 and the third source electrode SE3 of the third switching element TFT3.

According to embodiments, the first sub-pixel electrode PE1 includes a transparent conductive material such as indium tin oxide (ITO) or indium zinc oxide (IZO). The ITO may be a polycrystalline or monocrystalline material, and the IZO may be a polycrystalline or monocrystalline material as well. Alternatively, the IZO may be an amorphous material.

According to embodiments, as illustrated in FIG. 8, the first sub-pixel electrode PE1 includes a stem electrode 613 and a plurality of branch electrodes 601a, 601b, 601c and 601d. The stem electrode 613 and the branch electrodes 601a, 601b, 601c and 601d may be integrally formed.

According to embodiments, the stem electrode 613 divides the first sub-pixel area P1 into a plurality of domains. For example, the stem electrode 613 includes a horizontal portion 611 and a vertical portion 612 that intersect each other. The horizontal portion 611 divides the first sub-pixel area P1 into two domains, and the vertical portion 612 divides each of the two divided domains into another two smaller domains. A pixel area P is divided into four domains A, B, C and D by the horizontal portion 611 and the vertical portion 612 of the stem electrode 613.

According to embodiments, the branch electrodes include first, second, third and fourth branch electrodes 601a, 601b, 601c and 601d the respectively extend in different directions from the stem electrode 613. That is, the first, second, third and fourth branch electrodes 601a, 601b, 601c and 601d extend into the respective domains A, B, C and D from the stem electrode 613. For example, the first branch electrode 601a is disposed in the first domain A, the second branch electrode 601b is disposed in the second domain B, the third branch electrode 601c is disposed in the third domain C, and the fourth branch electrode 601d is disposed in the fourth domain D.

According to embodiments, the first branch electrode 601a and the second branch electrode 601b are symmetric with respect to the vertical portion 612 and the third branch electrode 601c and the fourth branch electrode 601d are symmetric with respect to the vertical portion 612. In addition, the first branch electrode 601a and the fourth branch electrode 601d are symmetric with respect to the horizontal portion 611 and the second branch electrode 601b and the third branch electrode 601c are symmetric with respect to the horizontal portion 611.

According to embodiments, a plurality of first branch electrodes 601a are provided at the first domain A. The plurality of first branch electrodes 601a are parallel with one another. Some of the first branch electrodes 601a extend diagonally from one side of the horizontal portion 611 into the first domain A. In addition, some of the first branch electrodes 601a extend diagonally from one side of the vertical portion 612 into the first domain A.

According to embodiments, a plurality of second branch electrodes 601b are provided at the second domain B. The plurality of second branch electrodes 601b are parallel with one another. Some of the second branch electrodes 601b extend diagonally from one side of the horizontal portion 611 into the second domain B. In addition, some of the second branch electrodes 601b extend diagonally from one side of the vertical portion 612 into the second domain B.

According to embodiments, a plurality of third branch electrodes 601c are provided at the third domain C. The plurality of third branch electrodes 601c are parallel with one another. Some of the third branch electrodes 601c extend diagonally from one side of the horizontal portion 611 into the third domain C. In addition, some of the third branch electrodes 601c extend diagonally from one side of the vertical portion 612 into the third domain C.

According to embodiments, a plurality of fourth branch electrodes 601d are provided at the fourth domain D. The plurality of fourth branch electrodes 601d are parallel with one another. Some of the fourth branch electrodes 601d extend diagonally from one side of the horizontal portion 611 into the fourth domain D. In addition, some of the fourth branch electrodes 601d extend diagonally from one side of the vertical portion 612 into the fourth domain D.

In an exemplary embodiment, the aforementioned stem electrode 613 further includes a first connection portion 614a and a second connection portion 614b. The first connection portion 614a is connected to one end portion of the horizontal portion 611 and the second connection portion 614b is connected to another end portion of the horizontal portion 611. The first connection portion 614a and the second connection portion 614b are parallel to the vertical portion 612. The first connection portion 614a and the second connection portion 614b may be integrally formed with the stem electrode 613.

According to embodiments, end portions of at least two first branch electrodes 601a disposed in the first domain A and end portions of at least two fourth branch electrodes 601d disposed in the fourth domain D are connected to each other by the second connection portion 614b. Similarly, end portions of at least two second branch electrodes 601b disposed in the second domain B and end portions of at least two third branch electrodes 601c disposed in the third domain C are connected to each other by the first connection portion 614a.

In addition, according to embodiments, end portions of at least two first branch electrodes 601a disposed in the first domain A and end portions of at least two second branch electrodes 601b disposed in the second domain B are connected to each other by a different connection portion. In addition, end portions of at least two third branch electrodes 601c disposed in the third domain C and end portions of at least two fourth branch electrodes 601d disposed in the fourth domain D are connected to each other by another different connection portion.

According to embodiments, as illustrated in FIG. 7, the second sub-pixel electrode PE2 is disposed in a second sub-pixel area P2. The second sub-pixel area P2 includes an area defined by the second hole 42 of the first storage electrode 751 described above. For example, in addition to the area defined by the second hole 42, the second sub-pixel area P2 further includes an overlap area of the first storage electrode 751 and the second sub-pixel electrode PE2 of FIG. 1.

According to embodiments, as illustrated in FIG. 1, the second sub-pixel electrode PE2 is disposed between the first sub-pixel electrode PE1 and the first gate line GL1. As illustrated in FIG. 1, at least a portion of the second sub-pixel electrode PE2 is disposed in the second hole 42 defined by the aforementioned first storage electrode 751. For example, a portion of the second sub-pixel electrode PE2, except one edge thereof, is disposed in the second hole 42. One edge of the second sub-pixel electrode PE2 overlaps the first storage electrode 751. In addition, as illustrated in FIG. 12, the second sub-pixel electrode PE2 is disposed on the color filter 354.

According to embodiments, the second sub-pixel electrode PE2 is connected to the second switching element TFT2 through the second connection electrode 552. In other words, the second connection electrode 552 electrically connects the second sub-pixel electrode PE2 and the second drain electrode DE2 of the second switching element TFT2.

According to embodiments, the second sub-pixel electrode PE2 includes substantially the same materials as those included in the first sub-pixel electrode PE1 described above. That is, the second sub-pixel electrode PE2 and the first sub-pixel electrode PE1 can be simultaneously manufactured in substantially a same process.

According to embodiments, the second sub-pixel electrode PE2 has substantially the same structure as that of the first sub-pixel electrode PE1 described above. For example, the second sub-pixel electrode PE2 includes a stem electrode that divides the second sub-pixel area P2 into a plurality of domains, and branch electrodes that extend into each domain from the stem electrode. In addition, the second sub-pixel electrode PE2 further includes a first connection portion and a second connection portion.

According to embodiments, the stem electrode, the branch electrode, the first connection portion and the second connection portion of the second sub-pixel electrode PE2 are substantially the same as those of the first sub-pixel electrode PE1 described above, the descriptions of which will make reference to FIG. 5 and the related descriptions.

According to embodiments, an area of first sub-pixel electrode PE1 is substantially equal to or larger than that of the second sub-pixel electrode PE2. The area of the first sub-pixel electrode PE1 may be, for example, one to two times the area of the second sub-pixel electrode PE2.

According to embodiments, ass illustrated in FIGS. 1, 7 and 8, the first connection electrode 551 extends from the first sub-pixel electrode PE1 and is connected to the first drain electrode DE1 and the third source electrode SE3. For example, the first connection electrode 551 extends from the fourth branch electrode 601d of the first sub-pixel electrode PE1. The first connection electrode 551 is connected to the first drain electrode DE1 and the third source electrode DE3 through the first drain contact hole 31 of the color filter 354 and the first drain contact hole 11 of the protective layer 320.

According to embodiments, as illustrated in FIG. 10, the first connection electrode 551 is disposed on the color filter 354.

According to embodiments, as illustrated in FIG. 1, the first connection electrode 551 overlaps the first storage electrode 751, the storage line 750, the fourth storage electrode 754, the first gate line GL1 and the second gate line GL2.

According to embodiments, as illustrated in FIG. 7, at least a portion of the first connection electrode 551 is disposed between the second sub-pixel electrode PE2 and the second data line DL2. The portion of the first connection electrode 551 between the second sub-pixel electrode PE2 and the second data line DL2 is parallel to the second data line DL2.

According to embodiments, the first connection electrode 551 does not overlap the first data line DL1 or the extension electrode 999. In addition, the first connection electrode 551 does not overlap the first source electrode SE1 and the second source electrode SE2 connected to the extension electrode 999.

According to embodiments, as illustrated in FIG. 7, the first connection electrode 551 includes the first connection portion 551a and the second connection portion 551b.

According to embodiments, the first connection portion 551a extends from the first sub-pixel electrode PE1 parallel to the second data line DL2. At least a portion of the first connection portion 551a is disposed between the second sub-pixel electrode PE2 and the second data line DL2. The portion of the first connection portion 551a between the second sub-pixel electrode PE2 and the second data line DL2 overlaps the first storage electrode 751 and the storage line 750.

According to embodiments, the second connection portion 551b extends diagonally from the first connection portion 551a to connect to the first drain electrode DE1. The second connection portion 551b overlaps the first gate line GL1, the second gate line GL2 and the fourth storage electrode 754.

According to embodiments, as illustrated in FIG. 1, an angle θ1 between the second connection portion 551b and the first gate line GL1 is an obtuse angle.

According to embodiments, as illustrated in FIG. 1, an angle θ2 between the second connection portion 551b and the first connection portion 551a is an obtuse angle.

According to embodiments, as illustrated in FIGS. 1, 7 and 8, the first dummy electrode 881 extends from the first sub-pixel electrode PE1. For example, the first dummy electrode 881 extends from the third branch electrode 601c of the first sub-pixel electrode PE1.

According to embodiments, as illustrated in FIG. 1, at least a portion of the first dummy electrode 881 is disposed between the second sub-pixel electrode PE2 and the first data line DL1. The first dummy electrode 881 is parallel to the first data line DL1. In addition, the first dummy electrode 881 is parallel to the first connection portion 551a of the first connection electrode 551.

According to embodiments, as illustrated in FIG. 1, a distance d1 between the first data line DL1 and the first dummy electrode 881 is substantially equal to a distance d2 between the second data line DL2 and the first connection portion 551a of the first connection electrode 551. In FIG. 1, the distance d1 refers to a distance between facing sides of the first data line DL1 and the first dummy electrode 881 and the distance d2 refers to a distance between facing sides of the second data line DL2 and the first connection electrode 551.

In addition, according to embodiments, as illustrated in FIG. 1, a distance d11 between the first dummy electrode 881 and the second sub-pixel electrode PE2 is substantially equal to a distance d22 between the first connection portion 551a of the first connection electrode 551 and the second sub-pixel electrode PE2. In FIG. 1, the distance d1 refers to a distance between facing sides of the first dummy electrode 881 and the second sub-pixel electrode PE2 and the distance d22 refers to a distance between facing sides of the first connection electrode 551 and the second sub-pixel electrode PE2.

According to embodiments, as illustrated in FIG. 7, the second sub-pixel electrode PE2 is disposed between the first dummy electrode 881 and the first connection electrode 551.

According to embodiments, as illustrated in FIGS. 1 and 7, the second dummy electrode 882 extends from the first connection electrode 551. For example, a connection portion between the first connection electrode 551 and the first drain electrode DE1 is disposed at the first drain contact holes 11 and 31, and the second dummy electrode 882 extends from the connection portion of the first connection electrode 551 toward the first dummy electrode 881.

According to embodiments, as illustrated in FIG. 1, the second dummy electrode 882 overlaps the first gate line GL1 and the second gate line GL2.

According to embodiments, as illustrated in FIG. 7, the second dummy electrode 882 includes a first dummy portion 882a and a second dummy portion 882b.

According to embodiments, the first dummy portion 882a extends diagonally from the connection portion of the first connection electrode 551. The first dummy portion 882a is disposed closer to the first data line DL1 than the second data line DL2.

According to embodiments, the second dummy portion 882b extends from the first dummy portion 882a toward the first dummy electrode 881. The second dummy portion 882b overlaps the first gate line GL1 and the second gate line GL2. The second dummy portion 882b is disposed closer to the first data line DL1 than the second data line DL2. The second dummy portion 882b is parallel to the first data line DL1 and the second data line DL2.

According to embodiments, as illustrated in FIG. 1, a distance d3 between the first data line DL1 and the second dummy portion 882b of the second dummy electrode 882 is substantially equal to the distance d1 between the first data line DL1 and the first dummy electrode 881. In addition, the distance d3 between the first data line DL1 and the second dummy portion 882b of the second dummy electrode 882 is substantially equal to the distance d2 between the second data line DL2 and the first connection portion 551a of the first connection electrode 551. In FIG. 1, the distance d3 refers to a distance between facing sides of the first data line DL1 and the second dummy electrode 882.

According to embodiments, as illustrated in FIG. 1, an end portion of the first dummy electrode 881 and an end portion of the second dummy electrode 882 face each other, having the extension electrode 999 therebetween.

According to embodiments, a distance between facing sides of the first dummy electrode 881 and the extension electrode 999 is different from a distance between facing sides of the second dummy electrode 882 and the extension electrode 999. For example, the distance between the facing sides of the first dummy electrode 881 and the extension electrode 999 is greater than the distance between the facing sides of the second dummy electrode 882 and the extension electrode 999.

According to embodiments, as illustrated in FIG. 1, an angle θ3 between the second dummy portion 882*b* and the first gate line GL1 is about 90 degrees.

According to embodiments, as illustrated in FIG. 1, an angle θ4 between the first dummy portion 882*a* and the second dummy portion 882*b* is an obtuse angle.

According to embodiments, as illustrated in FIGS. 1 and 7, the second connection electrode 552 extends from the second sub-pixel electrode PE2 to be connected to the second drain electrode DE2. For example, the second connection electrode 552 extends from the third branch electrode of the second sub-pixel electrode PE2. The second connection electrode 552 is connected to the second drain electrode DE2 through the second drain contact hole 32 of the color filter 354 and the second drain contact hole 12 of the protective layer 320.

According to embodiments, as illustrated in FIG. 10, the second connection electrode 552 is disposed on the color filter 354.

According to embodiments, as illustrated in FIG. 1, the second connection electrode 552 overlaps the first storage electrode 751, the storage line 750 and the third storage electrode 753.

According to embodiments, as illustrated in FIGS. 1 and 7, at least a portion of the second connection electrode 552 is disposed between the first dummy electrode 881 and the first connection electrode 551.

According to embodiments, each of the first connection electrode 551, the first dummy electrode 881 and the second dummy electrode 882 include substantially the same materials as first sub-pixel electrode PE1 described above. That is, the first connection electrode 551, the first dummy electrode 881, the second dummy electrode 882 and the first sub-pixel electrode PE1 can be simultaneously manufactured in substantially a same process.

According to embodiments, the first sub-pixel electrode PE1, the first connection electrode 551, the first dummy electrode 881 and the second dummy electrode 882 are integrally formed.

According to embodiments, the second sub-pixel electrode PE2 and the second connection electrode 552 are integrally formed.

Accordingly, according to embodiments, the first dummy electrode 881 is disposed between the second sub-pixel electrode PE2 and the first data line DL1, and the first connection electrode 551 is disposed between the second sub-pixel electrode PE2 and the second data line DL2. That is, the first dummy electrode 881 is disposed adjacent to the first data line DL1, and the first connection electrode 551 is disposed adjacent to the second data line DL2. The first dummy electrode 881 and the first connection electrode 551 are connected to the first sub-pixel electrode PE1. The first dummy electrode 881 and the first connection electrode 551 are disposed adjacent to the first data line DL and the second data line DL2 on opposite sides of the first sub-pixel electrode PE1, and accordingly, a deviation between a parasitic capacitance between the first data line DL1 and the first dummy electrode 881 and a parasitic capacitance between the second data line DL2 and the first connection electrode 551 can be substantially minimized. In other words, a deviation between a parasitic capacitance between the first sub-pixel electrode PE1 and the first data line DL1 and a parasitic capacitance between the first sub-pixel electrode PE1 and the second data line DL2 can be substantially minimized. Since the first connection electrode 551 does not overlap the extension electrode 999, an increase of the aforementioned deviation that may be caused by the overlap of the first connection electrode 551 and the extension electrode 999 can be substantially prevented.

In addition, according to embodiments, when the second dummy electrode 882 is further disposed adjacent to the first data line DL1, a deviation between a total length of the dummy electrodes adjacent to the first data line DL1, i.e., a length of the first dummy electrode 881 plus a length of the second dummy electrode 882, and a length of the first connection electrode 551 adjacent to the second data line DL2 can be further reduced. In such an exemplary embodiment, the deviation between the parasitic capacitance between the first sub-pixel electrode PE1 and the first data line DL1 and the parasitic capacitance between the first sub-pixel electrode PE1 and the second data line DL2 may be further reduced.

According to embodiments, the first shielding line 961 and the second shielding line 962 define a boundary between adjacent pixels. A pixel is positioned in an area, referred to as a pixel area, defined by the first shielding lines 961 and the second shielding lines 962.

According to embodiments, as illustrated in FIG. 1, the first shielding line 961 is disposed along the data line. For example, the first shielding line 961 is disposed along the first data line DL1 and overlaps the first data line DL1. The first shielding line 961 may overlap the entirety of the first data line DL1. In addition, as illustrated in FIGS. 9 and 12, the first shielding line 961 is disposed on the color filter 354.

According to embodiments, the first shielding line 961 is wider than the first data line DL1.

According to embodiments, the first shielding line 961 extends parallel to the first data line DL1. For example, the first shielding line 961 extends in the Y-axis direction.

According to embodiments, the first shielding line 961 receives a same voltage as a voltage of the common electrode 330. For example, the first shielding line 961 receives the common voltage from a power supply.

According to embodiments, the first shielding line 961 is also disposed on the second data line DL2. The first shielding line 961 on the second data line DL2 has substantially a same structure as that of the first shielding line 961 on the first data line DL1 described above.

According to embodiments, the first shielding line 961 substantially prevents formation of an electric field between the data lines, i.e., the first data line DL1 or the second data line DL2, and the sub-pixel electrodes i.e., the first sub-pixel electrode PE1 or the second sub-pixel electrode PE2. In addition, since the first shielding line 961 and the common electrode receive a same voltage, that is, the common voltage, the first shielding line 961 and the common electrode 330 are equipotential. Accordingly, light passing through the liquid crystal layer 333 between the first shielding line 961 and the common electrode 330 is blocked. Accordingly, light leakage at the data line is substantially prevented. In addition, since the first shielding line 961 replaces a portion of the light shielding layer 376 on the data line, the portion of the light shielding layer 376 on the data line can be removed when such a first shielding line 961 is used. Accordingly, when the shielding line 961 is used, an aperture ratio of the pixel PX can be further increased.

According to embodiments, as illustrated in FIG. 1, the second shielding line 962 intersects the first shielding line 961. The second shielding line 962 extends in a direction parallel to the first gate line GL1. For example, the second shielding line 962 extends in the X-axis direction.

According to embodiments, the second shielding line 962 is disposed at a boundary between adjacent pixels.

According to embodiments, as illustrated in FIG. 1, the second shielding line 962 overlaps the first storage electrode 751 and the second storage electrode 752.

According to embodiments, the second shielding line 962 is connected to the first shielding line 961. The second shielding line 962 and the first shielding line 961 may be formed integrally.

According to embodiments, since the second shielding line 962 and the common electrode receive a same voltage, that is, the common voltage, the second shielding line 962 and the common electrode 330 are equipotential. Accordingly, light passing through the liquid crystal layer 333 between the second shielding line 962 and the common electrode 330 is blocked. Accordingly, light leakage can be substantially prevented at a boundary area between adjacent pixels. In addition, since the second shielding line 962 replaces a portion of the light shielding layer 376 on the boundary area, the portion of the light shielding layer 376 on the boundary area can be removed when such a second shielding line 962 is used. Accordingly, when the second shielding line 962 is used, an aperture ratio of the pixel PX can be further increased.

According to embodiments, each of the first shielding line 961 and the second shielding line 962 include substantially the same materials as the first sub-pixel electrode PE1 described above. That is, the first shielding line 961, the second shielding line 962 and the first sub-pixel electrode PE1 can be simultaneously manufactured in substantially a same process.

According to embodiments, as illustrated in FIG. 3, the light shielding layer 376 is disposed at an area other than an area between the storage line 750 and one edge of the first sub-pixel electrode PE1. One edge of the first sub-pixel electrode PE1 refers to a portion of the first sub-pixel electrode that overlaps the first storage electrode 751 as described above.

According to embodiments, as illustrated in FIGS. 9, 10 and 11, the light shielding layer 376 is disposed on the second substrate 302. Alternatively, in other embodiments, the light shielding layer 376 can be disposed on the color filter 354 of the first substrate 301.

According to embodiments, as illustrated in FIGS. 9, 10, 11 and 12, the common electrode 330 is disposed on the light shielding layer 376 and the second substrate 302. The common electrode 330 is disposed over an entire surface of the second substrate 302, including the light shielding layer 376. Alternatively, in other embodiments, the common electrode 330 is disposed on a portion of the second substrate 302 that corresponds to the first sub-pixel area P1 and the second sub-pixel area P2. The common electrode 330 receives the common voltage from the power supply.

According to embodiments, the liquid crystal layer 333 is disposed between the first substrate 301 and the second substrate 302. The liquid crystal layer 333 includes liquid crystal molecules that have negative dielectric anisotropy and are vertically aligned. Alternatively, in other embodiments, the liquid crystal layer 333 includes a photopolymerizable material, and in such an exemplary embodiment, the photopolymerizable material may be a reactive monomer or a reactive mesogen.

Figure 13:
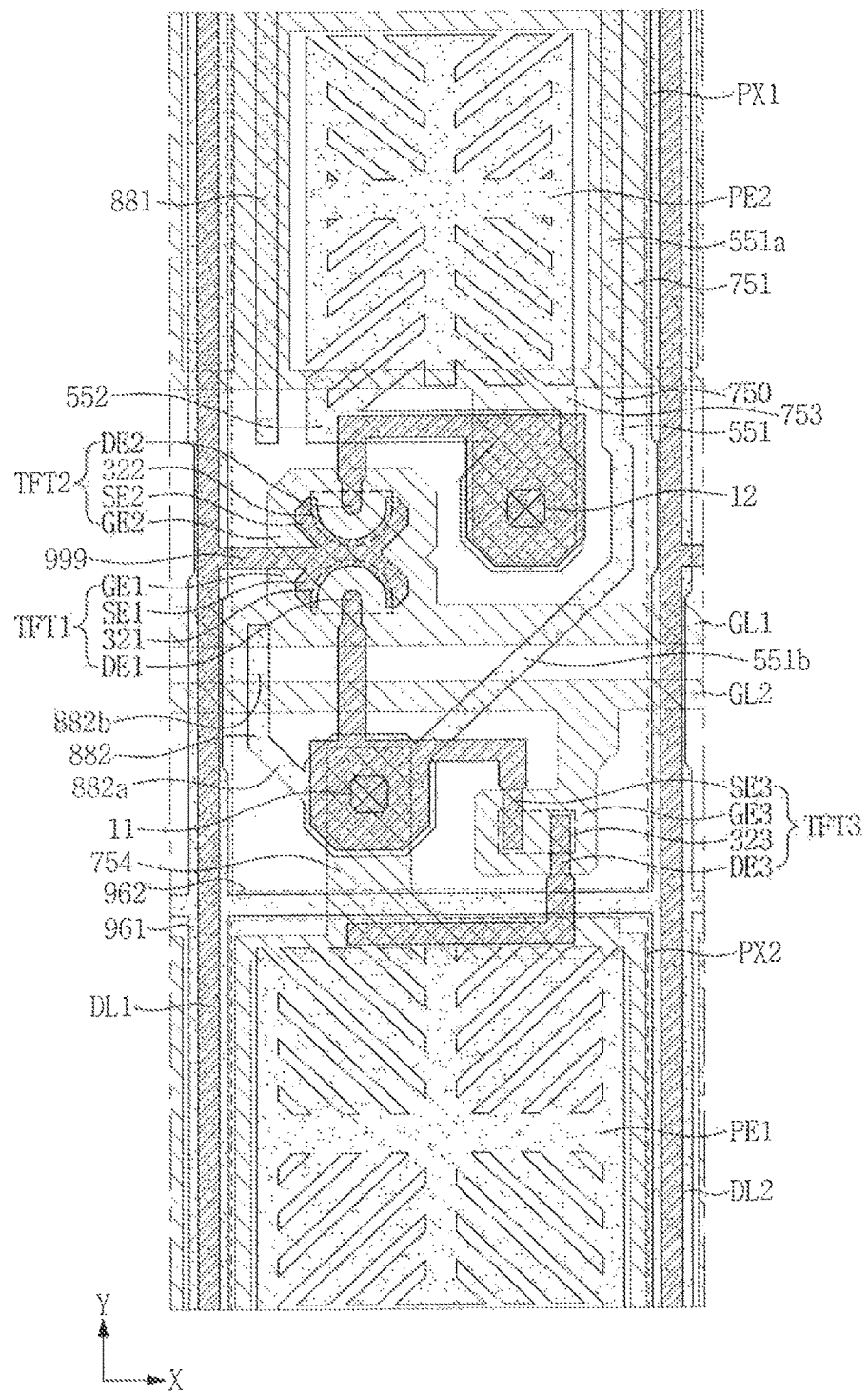
FIG. 13 illustrates two adjacent pixels having a structure as illustrated in FIG. 1.

FIG. 13 illustrates two adjacent pixels having a structure as illustrated in FIG. 1. In FIG. 13, a portion of the first pixel and a portion of the second pixel are illustrated. In an exemplary embodiment, each of the first pixel and the second pixel has substantially the same structure as that of a pixel of FIG. 1 described above.

According to embodiments, as illustrated in FIG. 13, the fourth storage electrode 754 of the first pixel PX1 is connected to the first storage electrode 751 of the second pixel PX2. In other words, the fourth storage electrode 754 of the first pixel PX1 is a part of the second storage electrode 752 of the second pixel PX2.

For example, the fourth storage electrode 754 of the first pixel PX1 is connected to the first storage electrode 751 of the adjacent second pixel PX2 with the second shielding line 962 therebetween. In such an exemplary embodiment, the fourth storage electrode 754 of the first pixel PX1 and the first storage electrode 751 of the second pixel PX2 may be integrally formed.

Figure 14:
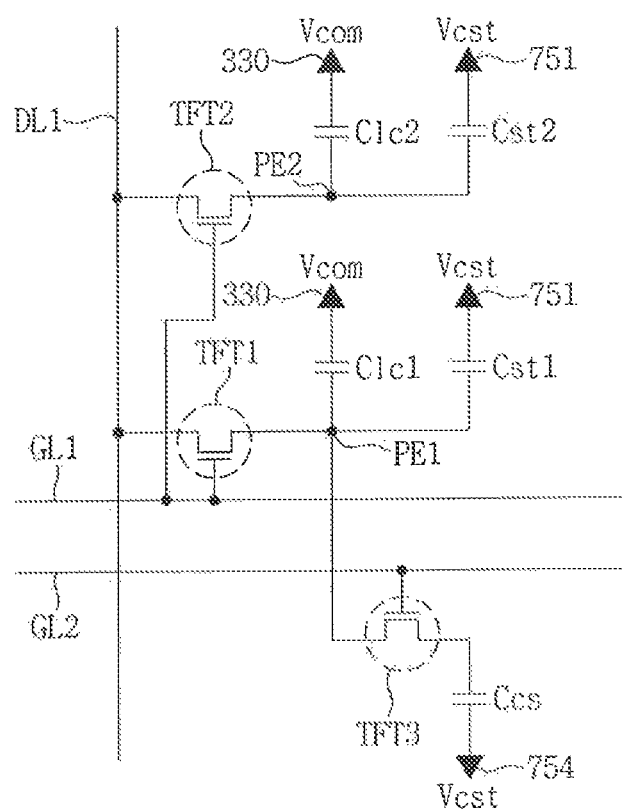
FIG. 14 is an equivalent circuit diagram of a pixel of FIG. 1.

FIG. 14 is an equivalent circuit diagram of a pixel of FIG. 1.

According to embodiments, as illustrated in FIG. 14, the pixel PX includes the first switching element TFT1, the second switching element TFT2, the third switching element TFT3, the first sub-pixel electrode PE1, the second sub-pixel electrode PE2, a first liquid crystal capacitor Clc1, a second liquid crystal capacitor Clc2, a charge sharing capacitor Ccs, a first storage capacitor Cst1 and a second storage capacitor Cst2.

According to embodiments, the first switching element TFT1 is connected to the first gate line GL1, the first data line DL1 and the first sub-pixel electrode PE1. The first switching element TFT1 is controlled by a first gate signal from the first gate line GL1 and is connected between the first data line DL1 and the first sub-pixel electrode PE1. The first switching element TFT1 is turned on by a gate high voltage of the first gate signal, and, when turned on, transmits a data voltage from the first data line DL1 to the first sub-pixel electrode PE1. The first switching element TFT1 is turned off by a gate low voltage of the first gate signal. Herein, the data voltage is an image data voltage.

According to embodiments, the first liquid crystal capacitor Clc1 is formed between the first sub-pixel electrode PE1 and the common electrode 330. The first liquid crystal capacitor Clc1 includes a first electrode connected to the first sub-pixel electrode PE1, a second electrode connected to the common electrode 330, and a liquid crystal layer between the first electrode and the second electrode. The first electrode of the first liquid crystal capacitor Clc1 is a part of the first sub-pixel electrode PE1 and the second electrode of the first liquid crystal capacitor Clc1 is a part of the common electrode 330.

According to embodiments, the common voltage Vcom is applied to the common electrode 330.

According to embodiments, the first storage capacitor Cst1 is formed between the first sub-pixel electrode PE1 and the first storage electrode 751. The first storage capacitor Cst1 includes a first electrode connected to the first sub-pixel electrode PE1, a second electrode connected to the first storage electrode 751, and a dielectric element between the first and second electrodes of the first storage capacitor Cst1. The dielectric element includes at least one insulating layer.

The first electrode of the first storage capacitor Cst1 is a part of the first sub-pixel electrode PE1 and the second electrode of the first storage capacitor Cst1 is a part of the first storage electrode 751.

According to embodiments, a storage voltage Vcst is transmitted to the first storage electrode 751. The storage voltage Vcst is substantially the same as the common voltage Vcom.

According to embodiments, the second switching element TFT2 is connected to the first gate line GL1, the first data line DL1 and the second sub-pixel electrode PE2. The second switching element TFT2 is controlled by the first gate signal from the first gate line GL1 and is connected between the first data line DL1 and the first sub-pixel electrode PE1. The second switching element TFT2 is turned on by a gate high voltage of the first gate signal and, when turned on, transmits the data voltage from the first data line DL1 to the second sub-pixel electrode PE2. The second switching element TFT2 is turned off by a gate low voltage of the first gate signal. Herein, the data voltage is an image data voltage.

According to embodiments, the second liquid crystal capacitor Clc2 is formed between the second sub-pixel electrode PE2 and the common electrode 330. The second liquid crystal capacitor Clc2 includes a first electrode connected to the second sub-pixel electrode PE2, a second electrode connected to the common electrode 330 and a liquid crystal layer between the first electrode and the second electrode. The first electrode of the second liquid crystal capacitor Clc2 is a part of the second sub-pixel electrode PE2 and the second electrode of the second liquid crystal capacitor Clc2 is a part of the common electrode 330.

According to embodiments, the second storage capacitor Cst2 is formed between the second sub-pixel electrode PE2 and the first storage electrode 751. The second storage capacitor Cst2 includes a first electrode connected to the second sub-pixel electrode PE2, a second electrode connected to the first storage electrode 751 and a dielectric element between the first and second electrodes of the second storage capacitor Cst2. The dielectric element includes at least one insulating layer. The first electrode of the second storage capacitor Cst2 is a part of the second sub-pixel electrode PE2 and the second electrode of the second storage capacitor Cst2 is a part of the first storage electrode 751.

According to embodiments, the third switching element TFT3 is connected to the second gate line GL2, the first sub-pixel electrode PE1 and the charge sharing capacitor Ccs. The third switching element TFT3 is controlled by a second gate signal from the second gate line GL2 and is connected between the first sub-pixel electrode PE1 and the charge sharing capacitor Ccs. The third switching element TFT3 is turned on by a gate high voltage of the second gate signal and, when turned on, transmits an electric charge of the first sub-pixel electrode PE1 to the charge sharing capacitor Ccs. Accordingly, the data voltage of the first sub-pixel electrode PE1 becomes lower than the data voltage of the second sub-pixel electrode PE2. The third switching element TFT3 is turned off by a gate low voltage of the second gate signal. That is, the first sub-pixel electrode PE1 receives a lower data voltage than that of the second sub-pixel electrode PE2. In other words, the first sub-pixel electrode PE1 is a sub-pixel electrode of a low gray level which receives a lower data voltage than that of the second sub-pixel electrode PE2, and the second sub-pixel electrode PE2 is a sub-pixel electrode of a high gray level which receives a higher data voltage than that of the first sub-pixel electrode PE1.

According to embodiments, the charge sharing capacitor Ccs is formed between the third drain electrode DE3 of the third switching element TFT3 and the fourth storage electrode 754. The charge sharing capacitor Ccs includes a first electrode connected to the third drain electrode DE3 of the third switching element TFT3, a second electrode connected to the fourth storage electrode 754, and a dielectric element between the first and second electrodes of the charge sharing capacitor Ccs. The dielectric element includes at least one insulating layer. The first electrode of the charge sharing capacitor Ccs is a part of the third drain electrode DE3 and the second electrode of the charge sharing capacitor Ccs is a part of the fourth storage electrode 754.

According to embodiments, the gate high voltage of the first gate signal described above is a high logic voltage of the first gate signal which is set to be greater than or equal to a threshold voltage of the first switching element TFT1 and a threshold voltage of the second switching element TFT2, and the gate low voltage of the first gate signal is a low logic voltage of the first gate signal which is set to be an off voltage of the first switching element TFT1 and an off voltage of the second switching element TFT2.

According to embodiments, the gate high voltage of the second gate signal described above is a high logic voltage of the second gate signal which is set to be greater than or equal to a threshold voltage of the third switching element TFT3 and the gate low voltage of the second gate signal is a low logic voltage of the second gate signal which is set to be an off voltage of the third switching element TFT3.

According to embodiments, during one frame period, the second gate signal has an output timing later than that of the first gate signal. For example, a time point of a rising edge of the second gate signal is at least later than a time point of a falling edge of the first gate signal. In other words, after the first gate signal transitions from a gate high voltage level to a gate low voltage level, the second gate signal transitions from a gate low voltage level to a gate high voltage level. Accordingly, of the first, second and third switching elements TFT1, TFT2 and TFT3 included in one pixel PX, the third switching element TFT3 is turned on last. That is, of the first, second and third switching elements TFT1, TFT2 and TFT3, the first switching element TFT1 and the second switching element TFT2 are substantially simultaneously turned on first, and after the first switching element TFT1 and the second switching element TFT2 are substantially simultaneously turned off, the third switching element TFT3 is turned on.

Figure 15:
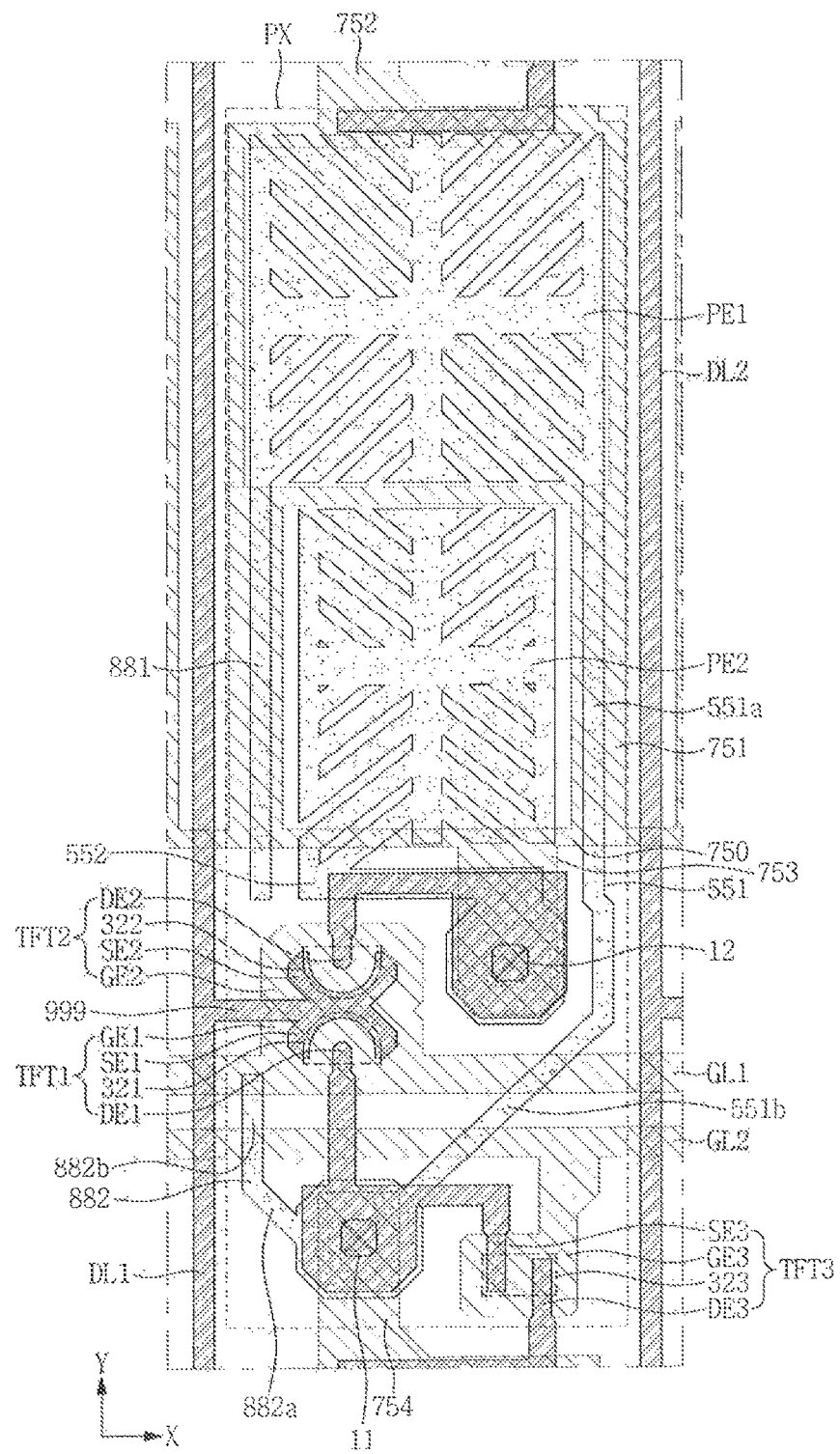
FIG. 15 is a plan view of a display device according to an alternative exemplary embodiment.

FIG. 15 is a plan view of a display device according to an alternative exemplary embodiment.

A display device of FIG. 15 is substantially the same as display devices of FIGS. 1 to 12 described above. However, according to embodiments, as illustrated in FIG. 15, the display device of FIG. 15 does not include the first shielding line 961 and the second shielding line 962.

Figure 16:
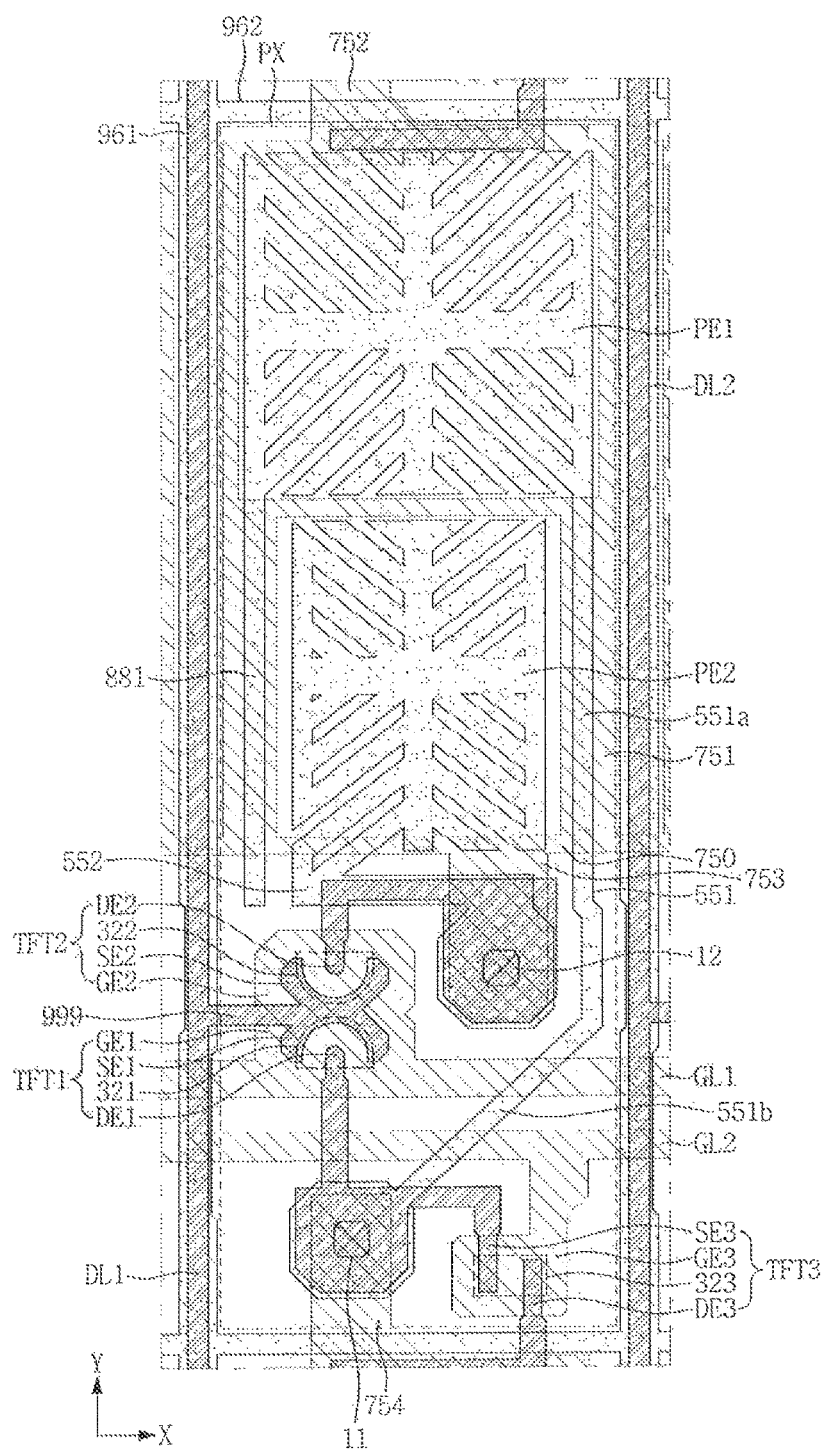
FIG. 16 is a plan view of a display device according to another alternative exemplary embodiment.

FIG. 16 is a plan view of a display device according to another alternative exemplary embodiment.

A display device of FIG. 16 is substantially the same as display devices of FIGS. 1 to 12 described above. However, according to embodiments, as illustrated in FIG. 16, the display device of FIG. 16 does not include the second dummy electrode 882.

Figure 17:
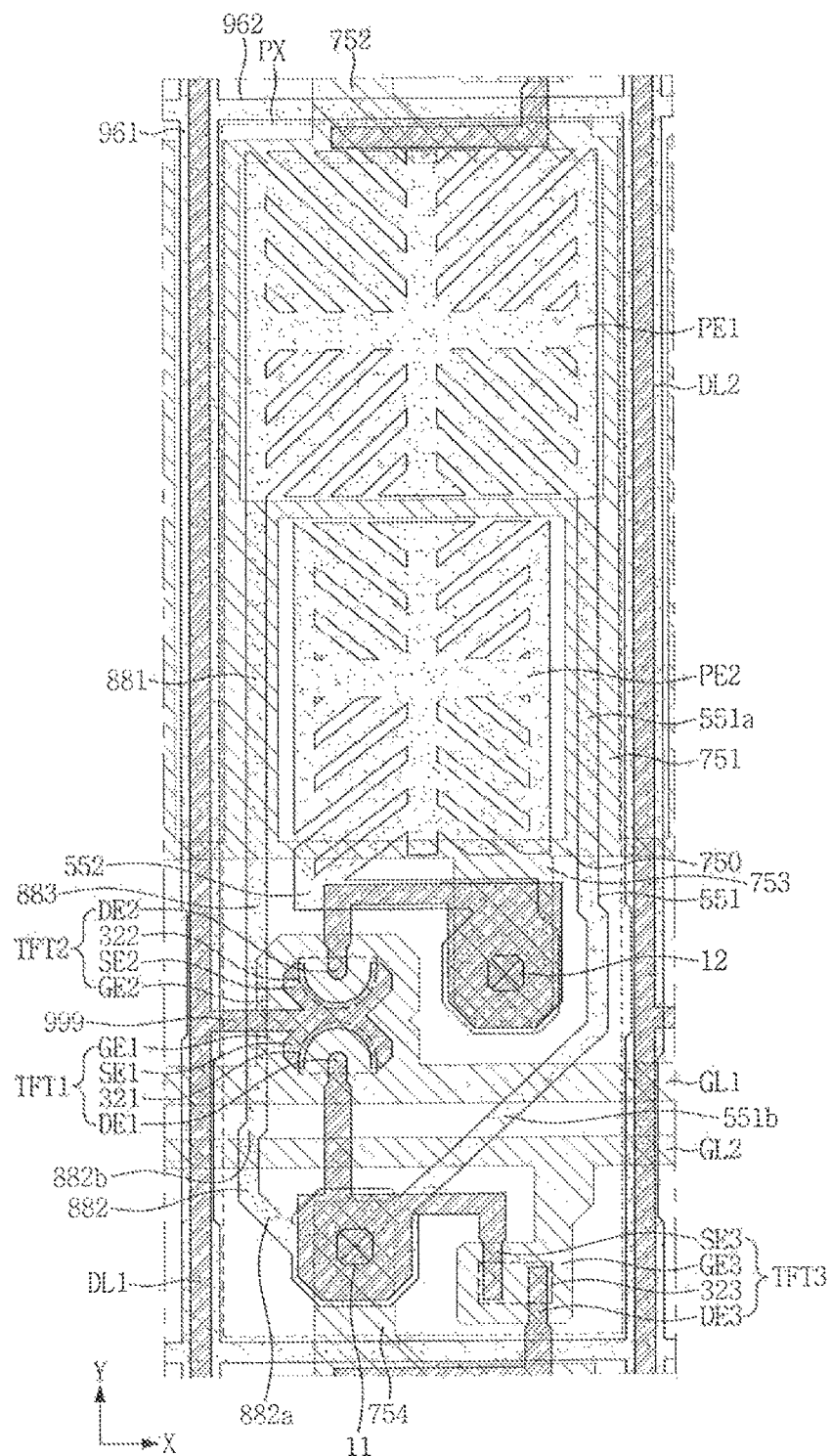
FIG. 17 is a plan view of a display device according to still another alternative exemplary embodiment.

FIG. 17 is a plan view of a display device according to still another alternative exemplary embodiment.

According to embodiments, a display device of FIG. 17 is substantially the same as display devices of FIGS. 1 to 12 described above. However, as illustrated in FIG. 17, the display device of FIG. 17 may further include a dummy connection electrode 883.

According to embodiments, the dummy connection electrode 883 connects the first dummy electrode 881 to the second dummy electrode 882. Accordingly, the first dummy electrode 881 and the second dummy electrode 882 are connected to each other. The dummy connection electrode 883 overlaps the aforementioned extension electrode 999 described above. The first dummy electrode 881, the second dummy electrode 881 and the dummy connection electrode 883 may be integrally formed.

According to embodiments, the dummy connection electrode 883 includes substantially the same materials and has substantially the same structure as the first sub-pixel electrode PE1. The dummy connection electrode 883 and the first sub-pixel electrode PE1 are simultaneously formed in substantially a same process.

As such, according to embodiments, when the first dummy electrode 881 and the second dummy electrode 882 are connected to each other by the dummy connection electrode 883, a total length of the entirety of dummy electrodes adjacent to the first data line DL1, which is the length of the first dummy electrode 881 plus the length of the second dummy electrode 882 plus the length of the dummy connection electrode 883, and a length of the aforementioned first connection electrode 551 are substantially equal to each other. In such an exemplary embodiment, a deviation between a parasitic capacitance between the first sub-pixel electrode PE1 and the first data line DL1 and a parasitic capacitance between the first sub-pixel electrode PE1 and the second data line DL2 can be further reduced.

FIG. 18 is a table that illustrates effects of exemplary embodiments.

According to embodiments, a first pixel EVEN and a second pixel ODD are connected to different gate lines and different data lines, respectively, and are vertically adjacent to each other. For example, the first pixel EVEN is connected to a first gate line and a first data line, and the second pixel ODD is connected to a second gate line and a second data line. The first pixel EVEN and the second pixel ODD are vertically adjacent to each other. For example, the first pixel EVEN corresponds to the aforementioned first pixel PX1 of FIG. 13, and the second pixel ODD corresponds to the aforementioned second pixel PX2 of FIG. 13.

According to embodiments, the first pixel EVEN and the second pixel ODD have substantially the same structure as the aforementioned pixel illustrated in FIG. 1.

According to embodiments, row label "High_Cdp_L" of the first pixel EVEN of FIG. 18 denotes a capacitance between a second sub-pixel electrode of the first pixel EVEN and the first data line, row label "High_Cdp_R" of the first pixel EVEN denotes a capacitance between the second sub-pixel electrode of the first pixel EVEN and the second data line, row label "Low_Cdp_L" of the first pixel EVEN denotes a first capacitance between a first sub-pixel electrode of the first pixel EVEN and the first data line, and row label "Low_Cdp_R" of the first pixel EVEN denotes a second capacitance between the first sub-pixel electrode of the first pixel EVEN and the second data line.

According to embodiments, row label "High_Cdp_L" of the second pixel ODD of FIG. 18 denotes a capacitance between a second sub-pixel electrode of the second pixel ODD and the first data line, row label "High_Cdp_R" of the second pixel ODD denotes a capacitance between the second sub-pixel electrode of the second pixel ODD and the second data line, row label "Low_Cdp_L" of the second pixel ODD denotes a third capacitance between a first sub-pixel electrode of the second pixel ODD and the first data line, and row label "Low_Cdp_R" of the second pixel ODD denotes a fourth capacitance between the first sub-pixel electrode of the second pixel ODD and the second data line.

According to embodiments, row label "ΔLow_Cdp(L-R)" associated with the first pixel EVEN denotes a deviation between the first capacitance and the second capacitance, and row label "ΔLow_Cdp(L-R)" associated with the second pixel ODD denotes a deviation between the third capacitance and the fourth capacitance.

According to embodiments, column label "−3 μm" indicates that the first sub-pixel electrode and the second sub-pixel electrode of the first pixel, and the first sub-pixel electrode and the second sub-pixel electrode of the second pixel, are shifted toward a left side, that is, toward the first data line, by 3 μm.

According to embodiments, column label "+3 μm" indicates that the first sub-pixel electrode and the second sub-pixel electrode of the first pixel, and the first sub-pixel electrode and the second sub-pixel electrode of the second pixel, are shifted toward a right side, that is, toward the second data line, by 3 μm.

According to embodiments, column label "0" indicates that the first sub-pixel electrode and the second sub-pixel electrode of the first pixel, and the first sub-pixel electrode and the second sub-pixel electrode of the second pixel, are not shifted.

According to embodiments, the values shown in FIG. 18 are capacitance deviation values, and an average capacitance deviation (AVG) in a non-shifted state is about 0.013, which is significantly smaller than the value for the shifted states.

As set forth hereinabove, in one or more exemplary embodiments, a display device may provide the following effects.

In a display device according to embodiments, a deviation between a parasitic capacitance between the first sub-pixel electrode and the first data line and a parasitic capacitance between the first sub-pixel electrode and the second data line can be substantially minimized. Accordingly, vertical crosstalk is reduced, which can improve image quality of the display device.

From the foregoing, it will be appreciated that various exemplary embodiments of the present disclosure have been described herein for purposes of illustration, and that various modifications may be made without departing from the scope and spirit of the present teachings. Accordingly, exemplary embodiments disclosed herein are not intended to be limiting of the true scope and spirit of the present teachings. Various features of the above described and other embodiments may be mixed and matched in any manner, to produce further embodiments consistent with the disclosure.

What is claimed is:

1. A display device comprising:
   a first gate line;
   a first data line and a second data line that are disposed adjacent to each other and that intersect the first gate line;
   a first sub-pixel electrode disposed between the first data line and the second data line;
   a second sub-pixel electrode disposed between the first gate line and the first sub-pixel electrode;
   a first switching element connected to the first gate line, the first data line and the first sub-pixel electrode;

a second switching element connected to the first gate line, the first data line and the second sub-pixel electrode;
a connection electrode that connects the first sub-pixel electrode and the first switching element;
a first dummy electrode disposed between the first data line and the second sub-pixel electrode; and
a second dummy electrode that extends from the connection electrode and is disposed closer to the first data line than the second data line,
wherein an end portion of the first dummy electrode and an end portion of the second dummy electrode face each other.

2. The display device as claimed in claim 1, wherein a distance between facing sides of the first dummy electrode and the first data line is substantially equal to a distance between facing sides of the second dummy electrode and the first data line.

3. The display device as claimed in claim 1, further comprising: an extension electrode that extends from the first data line and is connected to the first switching element and the second switching element, wherein at least a portion of the extension electrode is disposed between the first dummy electrode and the second dummy electrode.

4. The display device as claimed in claim 3, wherein a distance between facing sides of the first dummy electrode and the extension electrode is different from a distance between facing sides of the second dummy electrode and the extension electrode.

5. The display device as claimed in claim 4, wherein the distance between the facing sides of the first dummy electrode and the extension electrode is greater than the distance between the facing sides of the second dummy electrode and the extension electrode.

6. The display device as claimed in claim 3, wherein the connection electrode does not overlap the first data line or the extension electrode.

7. The display device as claimed in claim 1, wherein the first dummy electrode is longer than the second dummy electrode.

8. The display device as claimed in claim 1, wherein a distance between facing sides of the first dummy electrode and the first data line is substantially equal to a distance between facing sides of the connection electrode and the second data line.

9. The display device as claimed in claim 1, wherein a distance between facing sides of the first dummy electrode and the second sub-pixel electrode is substantially equal to a distance between facing sides of the connection electrode and the second sub-pixel electrode.

10. The display device as claimed in claim 1, wherein at least a portion of the connection electrode is disposed between the second sub-pixel electrode and the second data line.

11. The display device as claimed in claim 1, further comprising:
a first shielding line disposed along the first data line and that overlaps the first data line;
a second shielding line that intersects the first shielding line;
a third shielding line disposed along the second data line and that overlaps the second data line and intersects the second shielding line; and
a fourth shielding line disposed parallel to the second shielding line that intersects the first shielding line and the third shielding line.

12. The display device as claimed in claim 11, wherein the first sub-pixel electrode, the second sub-pixel electrode, the first switching element and the second switching element are disposed at an area surrounded by the first, second, third and fourth shielding lines.

13. The display device as claimed in claim 3, further comprising a dummy connection electrode that connects the first dummy electrode and the second dummy electrode to each other, wherein the dummy connection electrode overlaps the extension electrode.

14. The display device as claimed in claim 1, wherein the first sub-pixel electrode has an area that is greater than an area of the second sub-pixel electrode.

15. The display device as claimed in claim 1, further comprising:
a second gate line disposed adjacent to the first gate line and that intersects the first data line and the second data line; and
a third switching element connected to the second gate line, the connection electrode and a charge sharing capacitor.

16. The display device as claimed in claim 15, wherein a time point of applying a first gate signal to the first gate line is different from a time point of applying a second gate signal to the second gate line.

17. A display device comprising:
a first gate line;
a first data line and a second data line that are disposed adjacent to each other and that intersect the first gate line;
a first sub-pixel electrode disposed between the first data line and the second data line;
a second sub-pixel electrode disposed between the first gate line and the first sub-pixel electrode;
a first switching element connected to the first gate line, the first data line and the first sub-pixel electrode;
a second switching element connected to the first gate line, the first data line and the second sub-pixel electrode;
a connection electrode that connects the first sub-pixel electrode and the first switching element;
a second gate line disposed adjacent to the first gate line and that intersects the first data line and the second data line; and
a third switching element connected to the second gate line, the connection electrode and a charge sharing capacitor,
wherein a time point of applying a first gate signal to the first gate line is different from a time point of applying a second gate signal to the second gate line.

18. The display device of claim 17, further comprising:
a first dummy electrode disposed between the first data line and the second sub-pixel electrode; and
a second dummy electrode that extends from the connection electrode and is disposed closer to the first data line than the second data line,
wherein an end portion of the first dummy electrode and an end portion of the second dummy electrode face each other,
wherein a distance between facing sides of the first dummy electrode and the first data line is substantially equal to a distance between facing sides of the second dummy electrode and the first data line,
wherein a distance between facing sides of the first dummy electrode and the first data line is substantially equal to a distance between facing sides of the connection electrode and the second data line, wherein a distance between facing sides of the first dummy electrode and the second sub-pixel electrode is substantially equal to a distance between facing sides of the connection electrode and the second sub-pixel electrode.

19. The display device of claim 17, further comprising an extension electrode that extends from the first data line and is connected to the first switching element and the second switching element, wherein at least a portion of the extension electrode is disposed between the first dummy electrode and the second dummy electrode, and a distance between facing sides of the first dummy electrode and the extension electrode is different from a distance between facing sides of the second dummy electrode and the extension electrode.

20. The display device of claim 17, further comprising:
a first shielding line disposed along the first data line and that overlaps the first data line;
a second shielding line that intersects the first shielding line;
a third shielding line disposed along the second data line and that overlaps the second data line and intersects the second shielding line; and
a fourth shielding line disposed parallel to the second shielding line that intersects the first shielding line and the third shielding line,
wherein the first sub-pixel electrode, the second sub-pixel electrode, the first switching element and the second switching element are disposed at an area surrounded by the first, second, third and fourth shielding lines.

* * * * *